(12) United States Patent
Okada et al.

(10) Patent No.: US 7,368,068 B2
(45) Date of Patent: May 6, 2008

(54) SULFONIC GROUP-CONTAINING POLYARYLENE BLOCK COPOLYMER, PROCESS FOR PRODUCTION THEREOF, SOLID POLYMER ELECTROLYTE AND PROTON CONDUCTIVE MEMBRANE

(75) Inventors: Takashi Okada, Chuo-ku (JP); Mayumi Shinoda, Suzuka (JP); Kimihiko Yoshii, Chuo-ku (JP); Yousuke Konno, Chuo-ku (JP); Toshihiro Otsuki, Chuo-ku (JP); Kohei Goto, Chuo-ku (JP)

(73) Assignee: JSR Corporation, Tokyo (JP)

( * ) Notice: Subject to any disclaimer, the term of this patent is extended or adjusted under 35 U.S.C. 154(b) by 445 days.

(21) Appl. No.: 11/212,688

(22) Filed: Aug. 29, 2005

(65) Prior Publication Data

US 2006/0043344 A1 Mar. 2, 2006

(30) Foreign Application Priority Data

Aug. 30, 2004 (JP) ............................... 2004-250560

(51) Int. Cl.
*H01B 1/00* (2006.01)
*C08G 8/02* (2006.01)
*C08G 61/02* (2006.01)
*H01M 6/18* (2006.01)

(52) U.S. Cl. .................. 252/500; 528/86; 528/125; 528/401; 429/304; 429/306

(58) Field of Classification Search ................ 252/500; 429/304, 306; 528/86, 125, 401
See application file for complete search history.

(56) References Cited

U.S. PATENT DOCUMENTS

| | | | | |
|---|---|---|---|---|
| 6,825,310 B2* | 11/2004 | Goto et al. | ............ | 528/86 |
| 2002/0172850 A1* | 11/2002 | Asano et al. | ............ | 429/33 |
| 2002/0188097 A1* | 12/2002 | Goto et al. | ............ | 528/397 |
| 2004/0121211 A1 | 6/2004 | Asano et al. | | |
| 2004/0265668 A1* | 12/2004 | Okada et al. | ............ | 429/33 |

FOREIGN PATENT DOCUMENTS

| | | | |
|---|---|---|---|
| EP | 1 524 288 A2 | | 4/2005 |
| JP | 2005-146018 | * | 6/2005 |
| JP | 2005-220193 | * | 8/2005 |

\* cited by examiner

*Primary Examiner*—Mark Kopec
*Assistant Examiner*—Jaison Thomas
(74) *Attorney, Agent, or Firm*—Oblon, Spivak, McClelland, Maier & Neustadt, P.C.

(57) ABSTRACT

The present invention provides a sulfonic group-containing polyarylene block copolymer superior to the perfluoroalkyl-sulfonic acid polymers in cost, conductive properties and proccessability, a process for producing the copolymer, a solid polymer electrolyte and a proton conductive membrane.

The sulfonic group-containing polyarylene block copolymer includes a polymer segment with an ion conductive component represented by the formula (A) and at least one polymer segment without an ion conductive component represented by the formulae (B-1), (B-3) and the like and containing an aromatic ring bonded at the meta-positions or ortho-positions:

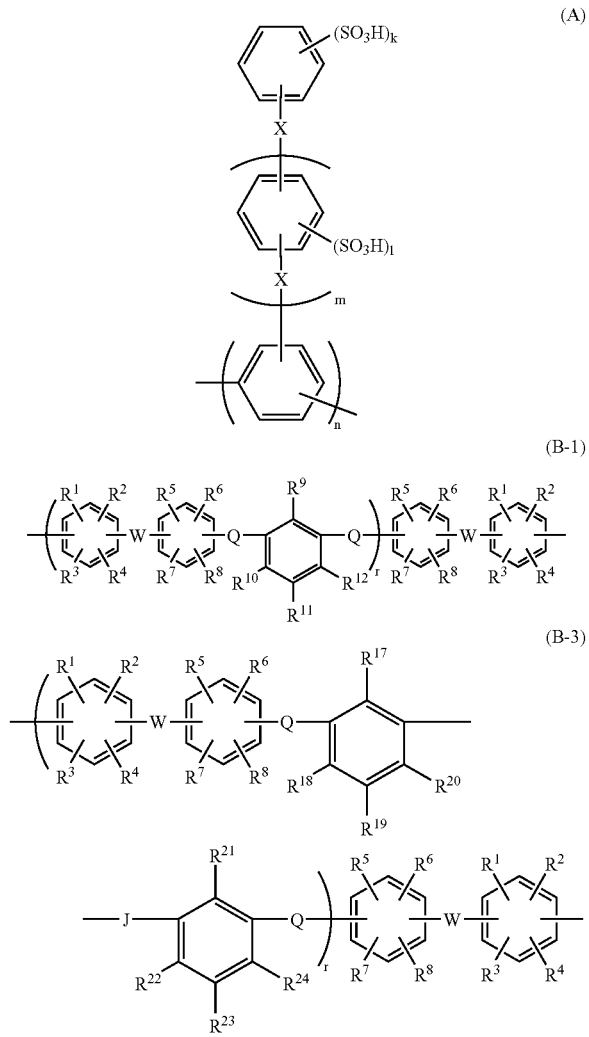

wherein X is a single bond, —CO—, —SO$_2$— or the like; W is a single bond, —CO—, —SO$_2$— or the like; Q is a single bond, —O—, —S— or the like; J is a single bond, —CO—, —SO$_2$— or the like; and R$^1$ to R$^{24}$ are each a hydrogen atom, a fluorine atom, an alkyl group or the like.

5 Claims, No Drawings

SULFONIC GROUP-CONTAINING POLYARYLENE BLOCK COPOLYMER, PROCESS FOR PRODUCTION THEREOF, SOLID POLYMER ELECTROLYTE AND PROTON CONDUCTIVE MEMBRANE

FIELD OF THE INVENTION

The present invention relates to a sulfonic group-containing polyarylene block copolymer and a process for production thereof, the copolymer having excellent proton conductivity, mechanical strength and thermal stability, being capable of giving films of good proccessability, and being suitable for use as electrolyte in solid polymer fuel cells. The present invention also relates to a solid polymer electrolyte comprising the copolymer and a proton conductive membrane including the copolymer.

BACKGROUND OF THE INVENTION

Solid electrolytes have recently been used more often than the conventional electrolyte (aqueous) solutions. This is firstly because those solid electrolytes have good proccessability in application in electric and electronic materials, and secondly because of the transitions to overall size and weight reduction and electric power saving.

Inorganic and organic proton conductive materials are known in the art. The inorganic proton conductive materials, such as uranyl phosphate hydrate, show inadequate bonding properties in the interface to cause many problems in forming a conductive layer on a substrate or an electrode.

On the other hand, the organic proton conductive materials include polymers that belong to the so-called cation exchange resins, for example sulfonated vinyl polymers such as polystyrene sulfonate; perfluoroalkylsulfonic acid polymers; and perfluoroalkylcarboxylic acid polymers. In particular, proton conductive membranes based on the perfluoroalkylsulfonic acid polymers represented by Nafion® (manufactured by Du Pont Kabushiki Kaisya) have been widely used. The perfluoroalkylsulfonic acid polymers possess high proton conductivity and can improve the forming property that has been a drawback of the inorganic conductive materials. However, on the other hand they are very expensive and are still unsatisfactory in terms of usability and mechanical properties at high temperatures. Therefore, a material has been desired that is more inexpensive, has thermal and mechanical stability and shows excellent ion conductivity as solid electrolyte membranes.

Approaches to the aforesaid problems include use of organic polymers such as polymers occurring by introducing a sulfonic acid or phosphate group in heat resistant polymers such as polybenzimidazole and polyether ether ketone (see non-patent documents 1 to 3).

Meanwhile, the organic proton conductive materials proposed so far include sulfonic group-containing polyarylenes. Such polymers are generally produced by polymerizing an aromatic compound into a base polymer and introducing sulfonic acid in the base polymer.

In general, the polymer basic skeleton including units from an aromatic compound provides a solid electrolyte membrane that is more stable thermally and mechanically than those obtained from the perfluoroalkylsulfonic acid polymers. However, the solid electrolyte membranes made of such polymers are excessively inflexible because of the aromatic skeleton or the sulfonic acid introduced in the main chain, and therefore they have bad proccessability. Specifically, it is often the case that the films are more brittle and exhibit lower bonding properties with carbon electrodes in MEA (membrane-electrode assembly) fabrication than films of the perfluoroalkylsulfonic acid polymers.

[Non-patent document 1] Polymer Preprints, Japan, Vol. 42, No. 7, p. 2490-2492 (1993)

[Non-patent document 2] Polymer Preprints, Japan, Vol. 43, No. 3, p. 735-736 (1994)

[Non-patent document 3] Polymer Preprints, Japan, Vol. 42, No. 3, p. 730 (1993)

DISCLOSURE OF THE INVENTION

The present invention has been made in view of the aforesaid background art. It is therefore an object of the present invention to provide a sulfonic group-containing polyarylene block copolymer and a process for producing the same wherein the copolymer has thermal and mechanical properties as exhibited by the conventional aromatic solid electrolytes and enhanced proccessability of membranes being a problem in the art, and is superior to the perfluoroalkylsulfonic acid polymers in cost, conductive properties and proccessability. It is another object of the present invention to provide a solid polymer electrolyte and a proton conductive membrane.

The present inventors studied the problems in the art as described above and have arrived at a sulfonic group-containing polyarylene block copolymer capable of excellent electrode bonding properties and proccessability in hot press processing in addition to thermal, mechanical and conductive properties as exhibited by the conventional aromatic solid electrolytes, wherein the copolymer comprises a polymer segment with an ion conductive component and a polymer segment without an ion conductive component and wherein a specific structural unit is introduced in the aromatic-based main chain skeleton. The present invention has been completed based on the finding.

Specifically, the sulfonic group-containing polyarylene block copolymer constitutes a polymer segment with an ion conductive component and a polymer segment without an ion conductive component, and a specific highly flexible monomer unit whose basic skeleton is based on an aromatic is introduced in the copolymer's main chain. The introduction of the specific monomer unit has been found to permit control of elastic modulus and elongation and to enable arbitrary control of the polymer's softening temperature near a hot press processing temperature, while maintaining high heat resistance and mechanical properties inherent to the aromatic polymers, thus leading to improved bonding properties with electrodes and proccessability.

The sulfonic group-containing polyarylene block copolymer, production process, solid polymer electrolyte and proton conductive membrane according to the present invention are as described below.

(1) A sulfonic group-containing polyarylene block copolymer comprising a polymer segment with an ion conductive component represented by the formula (A) and at least one polymer segment without an ion conductive component selected from polymer segments represented by the formulae (B-1), (B-2), (B-3), (B-4), (B-5) and (B-6):

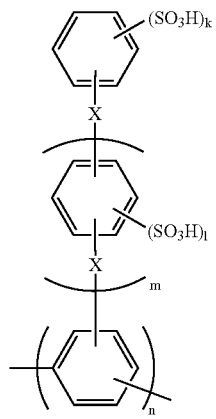

(A)

wherein X is a single bond, —CO—, —SO₂—, —SO—, —(CF₂)ₚ— (where p is an integer ranging from 1 to 10), —C(CF₃)₂—, —CH₂—, —C(CH₃)₂—, —O— or —S—; m is an integer ranging from 0 to 10; when m is any of 1 to 10, Xs may be the same or different; k is an integer ranging from 0 to 5; l is an integer ranging from 0 to 4; k+l≧1; n is a positive integer; and structural units making up the polymer segment may be the same or different in what is denoted by k, l, m and X;

wherein $R^1$ to R $R^{48}$ may be the same or different and are each at least one atom or group selected from the group consisting of a hydrogen atom, a fluorine atom, an alkyl group, a fluorine-substituted alkyl group, an allyl group, an aryl group and a cyano group; W is a single bond, —Co—, —SO₂—, —SO—, —CONH—, —COO—, —(CF₂)ₚ— (where p is an integer ranging from 1 to 10) or —C(CF₃)₂—; Q is a single bond, —O—, —S—, —CH=CH— or —C≡C—; J is a single bond, an alkylene group, a fluorine-

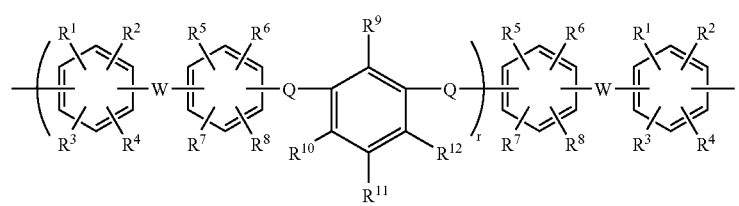 (B-1)

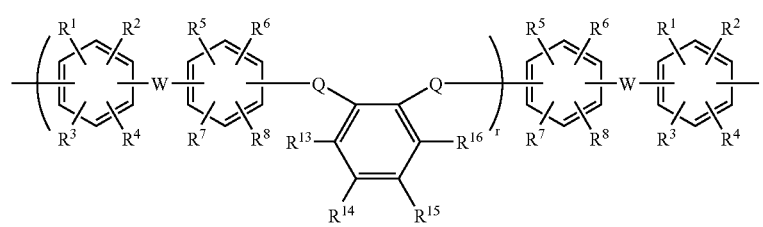 (B-2)

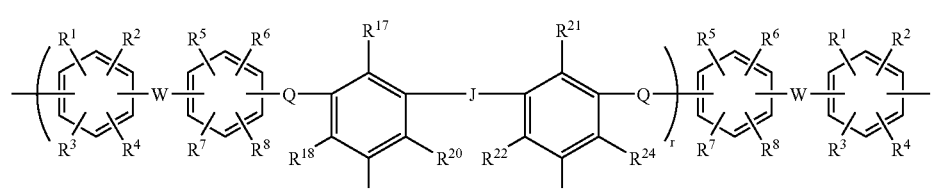 (B-3)

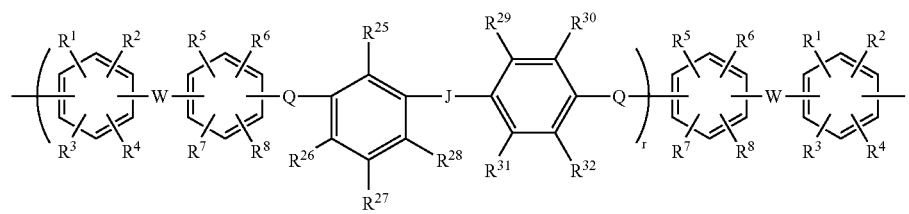 (B-4)

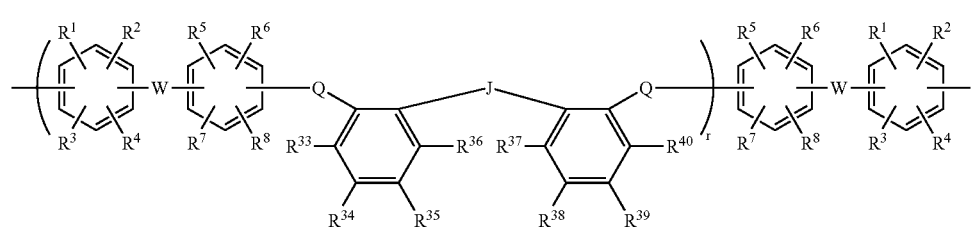 (B-5)

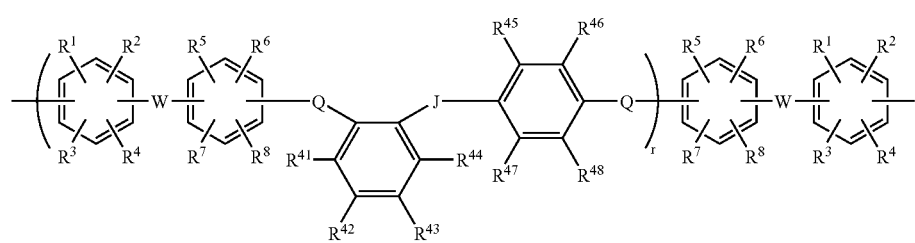 (B-6)

substituted alkylene group, an aryl-substituted alkylene group, an alkenylene group, an alkynylene group, an arylene group, a fluorenylidene group, —O—, —S—, —CO—, —CONH—, —COO—, —SO— or —SO$_2$—; and r is a positive integer.

(2) The sulfonic group-containing polyarylene block copolymer as described in (1), wherein the copolymer has an ion exchange capacity in the range of 0.3 to 5.0 meq/g.

(3) A process for producing a sulfonic group-containing polyarylene block copolymer, the process comprising polymerizing either a monomer capable of forming a structural unit of a polymer segment represented by the formula (A) or a monomer capable of forming a structural unit of a polymer segment represented by the formula (B-1), (B-2), (B-3), (B-4), (B-5) or (B-6) to produce a precursor, and reacting the precursor with the other monomer to produce a polyarylene block copolymer as described in (1) or (2).

(4) A polymer electrolyte comprising the sulfonic group-containing polyarylene block copolymer as described in (1) or (2).

(5) A proton conductive membrane including the sulfonic group-containing polyarylene block copolymer as described in (1) or (2).

EFFECT OF THE INVENTION

The sulfonic group-containing polyarylene block copolymer according to the present invention can be controlled in elastic modulus and elongation and be arbitrarily controlled in softening temperature near a hot press processing temperature, while maintaining high heat resistance and mechanical properties inherent to the aromatic polymers.

The polymer electrolyte and proton conductive membrane according to the present invention possess high heat resistance and mechanical properties and can be controlled in elastic modulus and elongation and be arbitrarily controlled in polymer's softening temperature near a hot press processing temperature.

PREFERRED EMBODIMENTS OF THE INVENTION

The sulfonic group-containing polyarylene block copolymer, production process, solid polymer electrolyte and proton conductive membrane according to the present invention will be hereinafter described in detail.

(Sulfonic Group-Containing Polyarylene Block Copolymer)

The sulfonic group-containing polyarylene block copolymer of the present invention includes a polymer segment with an ion conductive component represented by the formula (A) below and at least one polymer segment without an ion conductive component represented by the later-described formulae (B-1), (B-2), (B-3), (B-4), (B-5) and (B-6)

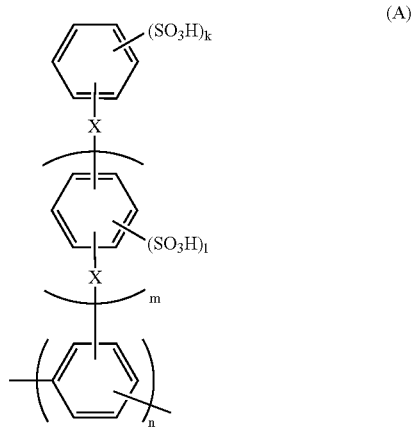

(A)

In the formula (A):

X is a single bond, —CO—, —SO$_2$—, —SO—, —(CF$_2$)$_p$— (where p is an integer ranging from 1 to 10), —C(CF$_3$)$_2$—, —CH$_2$—, —C(CH$_3$)$_2$—, —O— or —S—;

m is an integer ranging from 0 to 10, preferably from 0 to 8, more preferably from 0 to 5; when m is any of 1 to 10, Xs may be the same or different; and k is an integer ranging from 0 to 5; 1 is an integer ranging from 0 to 4; k+1≧1; in particular, k is preferably an integer ranging from 1 to 4, 1 is preferably an integer ranging from 0 to 3, and m is preferably an integer ranging from 0 to 5.

Structural units making up the polymer segment of the formula (A) may be the same or different in what is denoted by k, l, m and X.

That is, the polymer segment of the formula (A) is made up of as many as indicated by n of structural units (a):

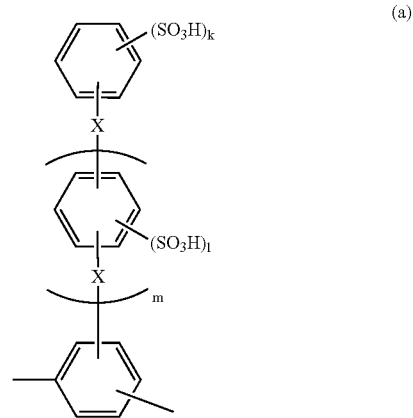

(a)

wherein k, l, m and X are independent from one another and may be the same or different among the structural units (a) within the limits described above.

In the formula (A), n is a positive integer, preferably ranging from 1 to 150, more preferably from 5 to 80. The letter n determines how many sulfonic groups are contained in the segment of the formula (A) of copolymer, and the number of sulfonic groups greatly influences the proton conductivity. Provided that samples have an identical amount of sulfonic groups introduced, the proton conductivity tends to be higher in a sample containing more sulfonic groups in the segment of the formula (A).

The average number of sulfonic groups in the polymer segment of the formula (A) can be generally regulated by the number n of the structural units (a) in the segment of the formula (A), the number m which the side chain repeats, and the molar ratio in which the monomer for forming the structural unit (a) and the other copolymerization component are fed. In the synthesis of the copolymer, setting these numbers and ratio high increases the sulfonic groups in the segment of the formula (A). The average number of sulfonic groups can be also manipulated by synthesizing the copolymer in an altered addition sequence of the monomer for forming the structural unit (a) and the other copolymerization component.

The introduction of structure of the formula (A) in the copolymer provides the primary structure of polymer with a sulfonated flexible long side chain structure and a structure having many neighboring sulfonic groups. This leads to an increased efficiency of the sulfonic groups associating with protons. Accordingly, the copolymer of the present invention can achieve a proton conductivity of a level of the conventional sulfonated (co)polymers, with a relatively low equivalent of sulfonic group.

The sulfonic group-containing polyarylene block copolymer of the present invention includes the polymer segment of the formula (A) as described above and at least one polymer segment without an ion conductive component selected from polymer segments of the formulae (B-1), (B-2), (B-3), 5 (B-4), (B-5) and (B-6) illustrated below:

In the formulae (B-1), (B-2), (B-3), (B-4), (B-5) and (B-6), $R^1$ to $R^{48}$ may be the same or different and are each at least one atom or group selected from the group consisting of a hydrogen atom, a fluorine atom, an alkyl group, a fluorine-substituted alkyl group, an allyl group, an aryl group and a cyano group.

The alkyl groups include methyl, ethyl, propyl, butyl, amyl and hexyl groups, with the methyl and ethyl groups being preferable.

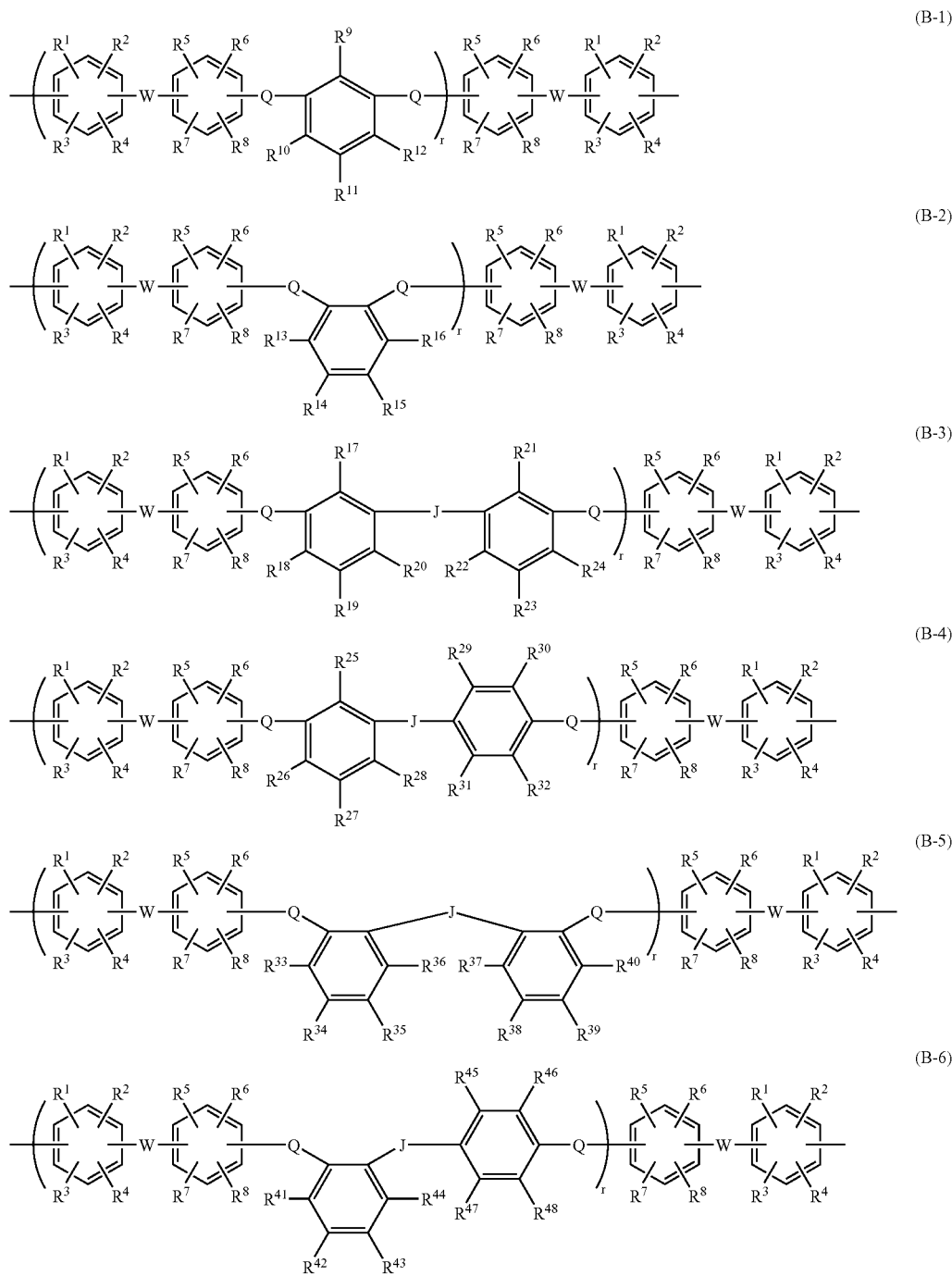

The fluorine-substituted alkyl groups include trifluoromethyl, perfluoroethyl, perfluoropropyl, perfluorobutyl, perfluoropentyl and perfluorohexyl groups, with the trifluoromethyl and pentafluoroethyl groups being preferable.

The allyl groups include propenyl group.

The aryl groups include phenyl and pentafluorophenyl groups.

W is a single bond, —CO—, —SO$_2$—, —SO—, —CONH—, —COO—, —(CF$_2$)$_p$— (where p is an integer ranging from 1 to 10) or —C(CF$_3$)$_2$—.

Q is a single bond, —O—, —S—, —CH=CH— or —C≡C—.

J is a single bond, an alkylene group, a fluorine-substituted alkylene group, an aryl-substituted alkylene group, an alkenylene group, an alkynylene group, an arylene group, a fluorenylidene group, —O—, —S—, —CO—, —CONH—, —COO—, —SO— or —SO$_2$—.

The alkylene groups, fluorine-substituted alkylene groups, aryl-substituted alkylene groups, alkenylene groups, alkynylene groups, arylene groups and fluorenylidene groups include —C(CH$_3$)$_2$—, —CH=CH—, —CH=CH—CH$_2$—, —C≡C—, —(CF$_2$)$_p$— (where p is an integer ranging from 1 to 10), —C(CF$_3$)$_2$—, and groups represented by the following formulae:

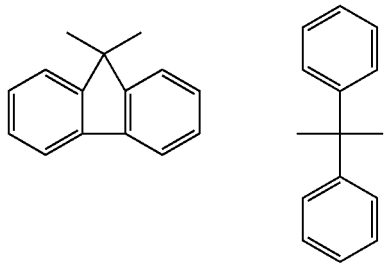

Structural units making up the polymer segment of the formula (B-1), (B-2), (B-3), (B-4), (B-5) or (B-6) may be the same or different in what is denoted by $R^1$ to $R^{48}$, W, Q and J.

That is, the polymer segment of the formula (B-1) is made up of as many as indicated by r of repeating units (b-1) in which $R^1$ to $R^{12}$, W and Q are independent from one another and may be the same or different among the repeating units (b-1) within the limits described above; the polymer segment of the formula (B-2) is made up of as many as indicated by r of repeating units (b-2) in which $R^1$ to $R^8$, $R^{13}$ to $R^{16}$, W and Q are independent from one another and may be the same or different among the repeating units (b-2) within the limits described above; the polymer segment of the formula (B-3) is made up of as many as indicated by r of repeating units (b-3) in which $R^1$ to $R^8$, $R^{17}$ to $R^{24}$, W, Q and J are independent from one another and may be the same or different among the repeating units (b-3) within the limits described above; the polymer segment of the formula (B-4) is made up of as many as indicated by r of repeating units (b-4) in which $R^1$ to $R^8$, $R^{25}$ to $R^{32}$, W, Q and J are independent from one another and may be the same or different among the repeating units (b-4) within the limits described above; the polymer segment of the formula (B-5) is made up of as many as indicated by r of repeating units (b-5) in which $R^1$ to $R^8$, $R^{33}$ to $R^{40}$, W, Q and J are independent from one another and may be the same or different among the repeating units (b-5) within the limits described above; and the polymer segment of the formula (B-6) is made up of as many as indicated by r of repeating units (b-6) in which $R^1$ to $R^8$, $R^{41}$ to $R^{48}$, W, Q and J are independent from one another and may be the same or different among the repeating units (b-6) within the limits described above.

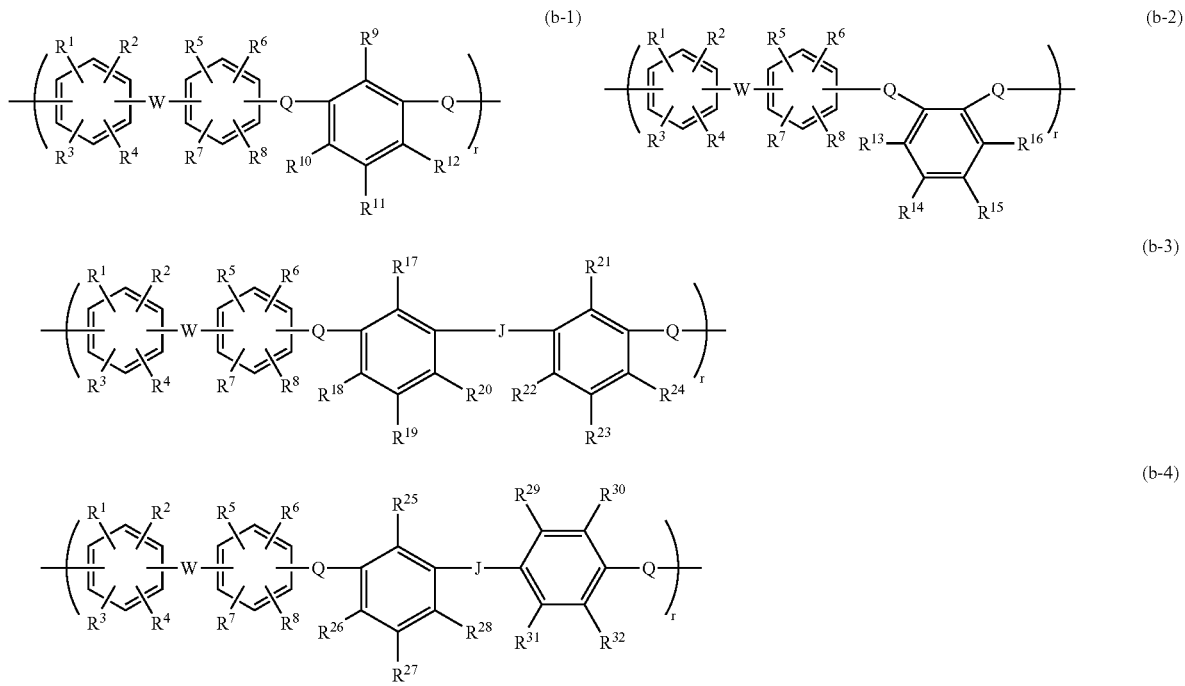

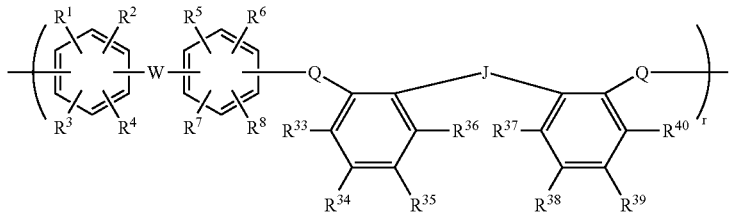

(b-5)

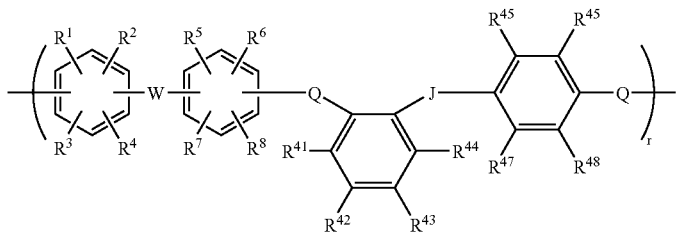

(b-6)

In the formulae (B-1), (B-2), (B-3), (B-4), (B-5) and (B-6), r is a positive integer of up to 100, preferably from 5 to 80. The molecular weight of the polymer segment represented by the formula (B-1), (B-2), (B-3), (B-4), (B-5) or (B-6) significantly affects various properties. The higher the molecular weight, the better the properties such as hot water resistance, solvent resistance, heat resistance and oxidation resistance. Too high a molecular weight results in unfavorably increased solution viscosity of the copolymer.

The value of r may be controlled by using a compound with a structure in which any of the repeating units (b-1) to (b-6) repeats predetermined times, or by altering the feeding molar ratio and addition sequence of the monomer for forming any of the repeating units (b-1) to (b-6) and the other copolymerization component.

The sulfonic group-containing polyarylene block copolymer of the present invention contains the polymer segment (A) and at least one polymer segment selected from the polymer segments (B-1), (B-2), (B-3), (B-4), (B-5) and (B-6) These polymer segments can form a micro phase separation structure because of a hydrophilic-hydrophobic effect in molecular chains. The configuration of the micro phase separation structure can be controlled by the number of repeating units and composition of each polymer segment. Configurations of the micro phase separation structure provide varied properties as proton conductive membrane. The sulfonic group-containing polyarylene block copolymer of the present invention possesses a main chain skeleton formed by covalent bond of aromatic rings via bonding groups, and therefore is excellent in mechanical strength and heat resistance. Further, the polyarylene block copolymer is a material capable of forming films having a high glass transition temperature (high softening point). Accordingly, the thermal stability of the micro phase separation structure is excellent, namely, the proton conductive membrane exhibits good thermal stability.

The sulfonic group-containing polyarylene block copolymer of the present invention contains a bonding group including an aromatic ring that is bonded at the meta-positions or ortho-positions in the main chain skeleton of the polymer segment (B) The sulfonic group-containing polyarylene block copolymer may contain a bonding group including an aromatic ring that is bonded at the meta-positions or ortho-positions in the main chain skeleton of the polymer segment (A). Examples of such bonding groups include those of the formulae (D-1) and (D-2) given below:

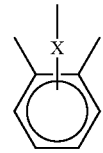

(D-1)

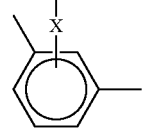

(D-2)

The compounds capable of introducing a bonding group structure with an aromatic ring that is bonded at the meta-positions or ortho-positions in the main chain skeleton of polymer segment include catechol, 3-methylcatechol, 1,2-dichlorobenzene, 1,2-dibromobenzene, 1,2-diiodobenzene, 4-methylcatechol, resorcinol, 2-methylresorcinol, 2,5-dimethylresorcinol, 4-ethylresorcinol, 1,3-dichlorobenzene, 1,3-dibromobenzene, 1,3-diiodobenzene, 2,6-dichlorobenzonitrile, 2,6-difluorobenzophenone, 2,6-dichlorobenzophenone, 2,4-dichlorobenzophenone, 2,4'-dichlorobenzophenone, 2,2'-dichlorobenzophenone, 2,6-difluorobenzophenone, 2,4-difluorobenzophenone, 2,4'-difluorobenzophenone, 2,2'-difluorobenzophenone, 2,2'-biphenol, 3,3'-biphenol, 2,4'-biphenol, 3,4'-biphenol, 2,2'-dihydroxydiphenylmethane, 3,3'-dihydroxydiphenylmethane, 2,4'-dihydroxydiphenylmethane, 3,4'-dihydroxydiphenylmethane, 2,2'-dihydroxydiphenylether, 3,3'-dihydroxydiphenylether, 2,4'-dihydroxydiphenylether, 3,4'-dihydroxydiphenylether, 2,2'-methylidenebis(4-methylphenol), 2,4'-methylidenebis(4-methylphenol), 2,4'-ethylidenebis(4-methylphenol), 2,2'-isopropylidenebisphenol, 2,3'-isopropylidenebisphenol, 2,4'-isopropylidenebisphenol, 3,3'-methylidenebis(1,1'-biphenyl-4-ol) and 9,9'-bis(2-hydroxy-4-methylphenyl)fluorene.

The sulfonic group-containing polyarylene block copolymer of the present invention preferably contains 0.1 to 99.9% by mass, more preferably 15.0 to 95.0% by mass, still preferably 30.0 to 90.0% by mass of the bonding group structure including an aromatic ring that is bonded at the meta-positions or ortho-positions. In general, the higher the content, the lower the softening point and elastic modulus of the polymer, and thus the better the bonding properties to electrodes and proccessability of films. Particularly, the softening point of film significantly affects the bonding properties to electrodes. When the film is bonded to an electrode by hot pressing, a softening point of film not more than the hot press temperature plus not more than 15° C., particularly a softening point not more than the hot press temperature ensures good bonding properties.

The sulfonic group-containing polyarylene block copolymer of the present invention contains 0.1 to 99.9% by mass, preferably 10.0 to 95.0% by mass, more preferably 20.0 to 90.0% by mass of the polymer segment represented by the formula (A), and 0.1 to 99.9% by mass, preferably 5.0 to 90.0% by mass, more preferably 10.0 to 80.0% by mass of one or more of the polymer segments represented by the formulae (B-1), (B-2), (B-3), (B-4), (B-5) and (B-6).

The sulfonic group-containing polyarylene block copolymer of the present invention is composed of the polymer segment of the formula (A) and the polymer segment of the formula (B-1), (B-2), (B-3), (B-4), (B-5) or (B-6), and contains the specific highly flexible structural unit that is bonded at the meta-positions or ortho-positions in the structural unit forming the polymer's main chain skeleton. Accordingly, the polymer's softening temperature can be arbitrarily controlled near a hot press processing temperature and mechanical properties such as elastic modulus and elongation can be regulated, while maintaining high proton conductivity, and heat resistance and mechanical properties inherent to the aromatic polymers. Consequently, improvements can be achieved in bonding properties to electrodes and proccessability.

The sulfonic group-containing polyarylene block copolymer of the present invention includes the polymer segment of the formula (A) having a structure of aggregated sulfonic groups, and the polymer segment (hydrophobic segment) of the formula (B-1), (B-2), (B-3), (B-4), (B-5) or (B-6) having an appropriately hydrophobic nature; and the main chain skeleton includes the specific flexible structural unit. Accordingly, the polyarylene block copolymer exhibits high proton conductivity as well as excellent resistance to hot water, solvents, heat and oxidation, good tenacity, bonding properties to electrodes and proccessability, and therefore is suitable for use in solid polymer electrolytes and proton conductive membranes. Of the hydrophobic segments described above, the present invention preferably employs the polymer segments represented by the formulae (B-1), (B-3) and (B-5) for availability of monomers for forming the polymer segments and balance of various properties and bonding properties of the block copolymer.

(Process for Producing Sulfonic Group-Containing Polyarylene Block Copolymer)

The sulfonic group-containing polyarylene block copolymer of the present invention may be synthesized by copolymerizing a monomer capable of forming the structural unit (a) of the polymer segment of the formula (A) with a monomer capable of forming the repeating unit (b-1), (b-2), (b-3), (b-4), (b-5) or (b-6) of the polymer segment of the formula (B-1), (B-2), (B-3), (B-4), (B-5) or (B-6) Specifically, either the monomer capable of forming the structural unit (a) or the monomer capable of forming the structural unit (b) is polymerized to afford a precursor, and the precursor is reacted with the other monomer to produce the objective copolymer.

Alternatively, the sulfonic group-containing polyarylene block copolymer of the present invention may be synthesized by preparing a copolymer that includes a polymer segment having the same structure as represented by the formula (A) except containing no sulfonic group, and a polymer segment represented by the formula (B-1), (B-2), (B-3), (B-4), (B-5) or (B-6), and sulfonating the copolymer. Specifically, either a monomer capable of forming a structural unit having the same skeleton as the structural unit (a) except containing no sulfonic group or a monomer capable of forming the repeating unit (b-1), (b-2), (b-3), (b-4), (b-5) or (b-6) is polymerized to afford a precursor, the precursor obtained is reacted with the other monomer to produce the copolymer, and the copolymer is sulfonated to synthesize the objective copolymer.

The monomers used in the synthesis of the sulfonic group-containing polyarylene block copolymer according to the present invention include aromatic sulfonates represented by the formula (A') below and aromatic compounds represented by the formulae (B-1'), (B-2'), (B-3'), (B-4'), (B-5') and (B-6') below.

(Aromatic Sulfonates)

The aromatic sulfonates for use in the present invention are represented by the following formula (A'):

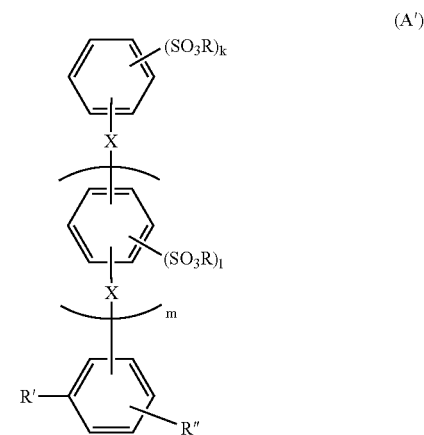

wherein:

X, k and l are the same as described in the formula (A)

R is a hydrocarbon group, preferably having 4 to 20 carbon atoms, with examples including linear, branched and alicyclic hydrocarbon groups such as tert-butyl, iso-butyl, n-butyl, sec-butyl, neopentyl, cyclopentyl, hexyl, cyclohexyl, cyclopentylmethyl, cyclohexylmethyl, adamantyl, adamantylmethyl, 2-ethylhexyl, bicyclo[2.2.1]heptyl and bicyclo[2.2.1]heptylmethyl; and R' and R" may be the same or different and are each a halogen atom excluding a fluorine atom or a group represented by —$OSO_2Z$ (where Z is an alkyl group, a fluorine-substituted alkyl group or an aryl group).

Indicated by Z, the alkyl groups include methyl and ethyl; the fluorine-substituted alkyl groups include trifluoromethyl; and the aryl groups include phenyl and p-tolyl.

Examples of the aromatic sulfonates represented by the formula (A') include the following compounds:

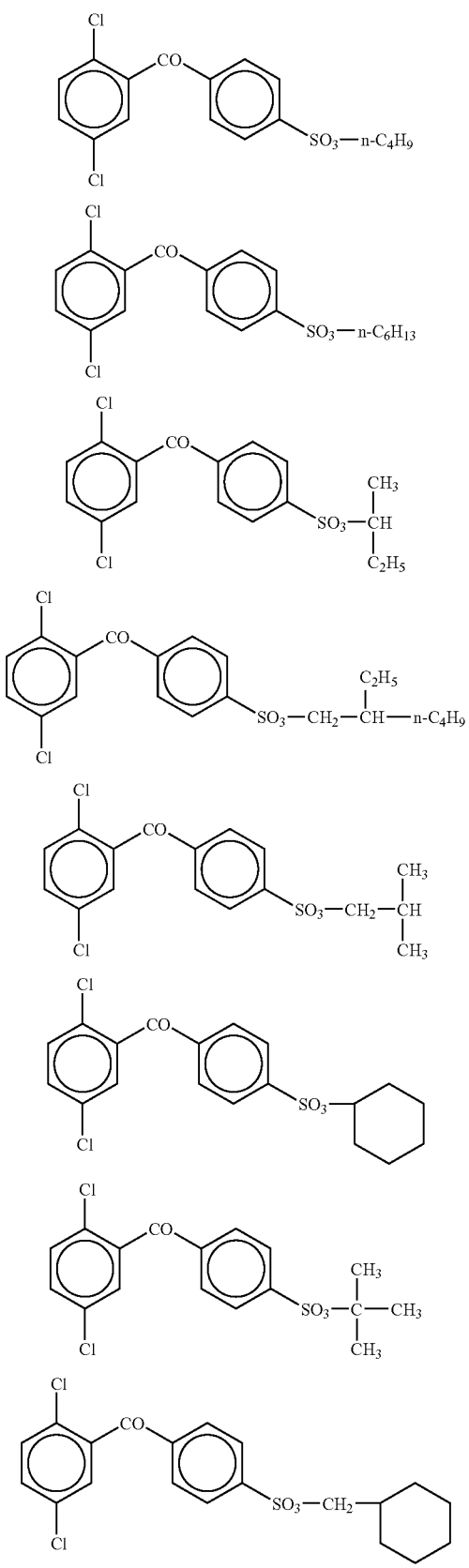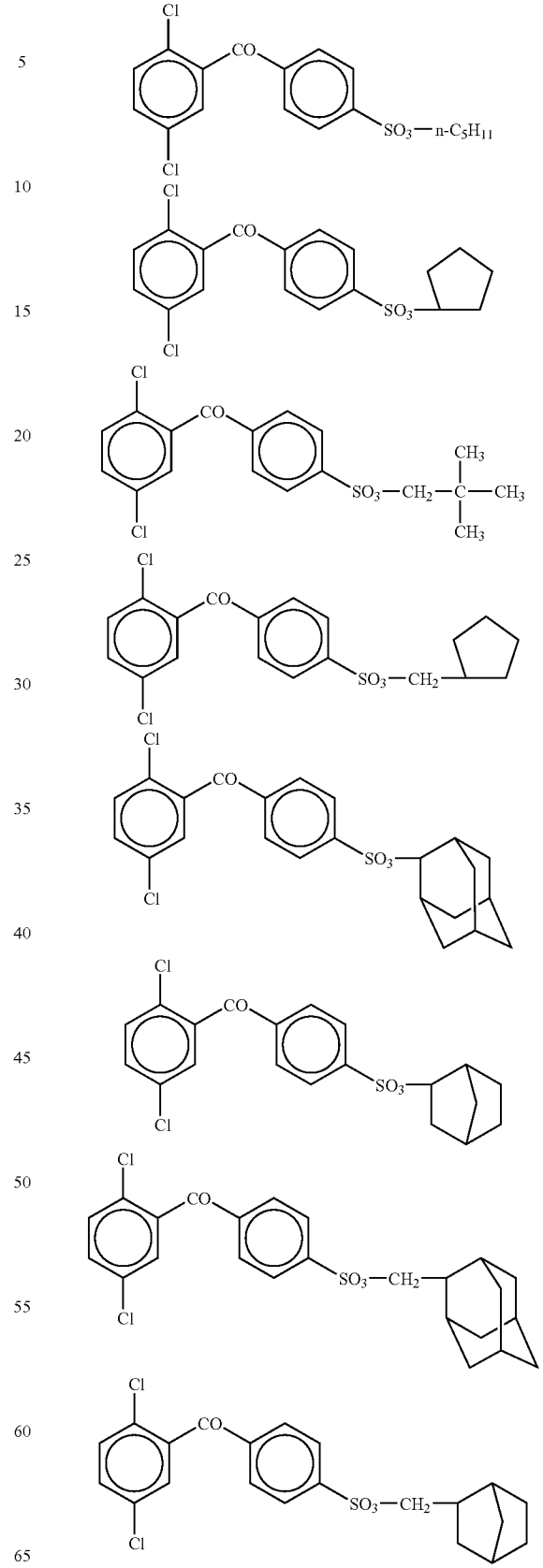

Examples of the aromatic sulfonates of the formula (A') further include compounds corresponding to the above compounds except that the chlorine atom is replaced by a halogen atom other than the chlorine atom or —OSO$_2$Z (where Z is an alkyl group, a fluorine-substituted alkyl group or an aryl group), compounds corresponding to the above compounds except that —CO— is replaced by —SO$_2$—, and compounds corresponding to the above compounds except that these two replacements occur at the same time.

The present invention may include compounds corresponding to the above compounds except that the disubstitution with functional groups at the para positions takes place at the meta positions or ortho positions. The use of such compounds permits introduction of the bonding group structure at meta or ortho positions in the main chain skeleton of the copolymer.

For stability during polymerization, the ester groups are preferably derived from a primary alcohol having bulky substituent groups such as branched or alicyclic structures.

(Aromatic Compounds)

5 The aromatic compounds for use in the present invention are represented by the formulae (B-1'), (B-2'), (B-3'), (B-4'), (B-5') and (B-6') below:

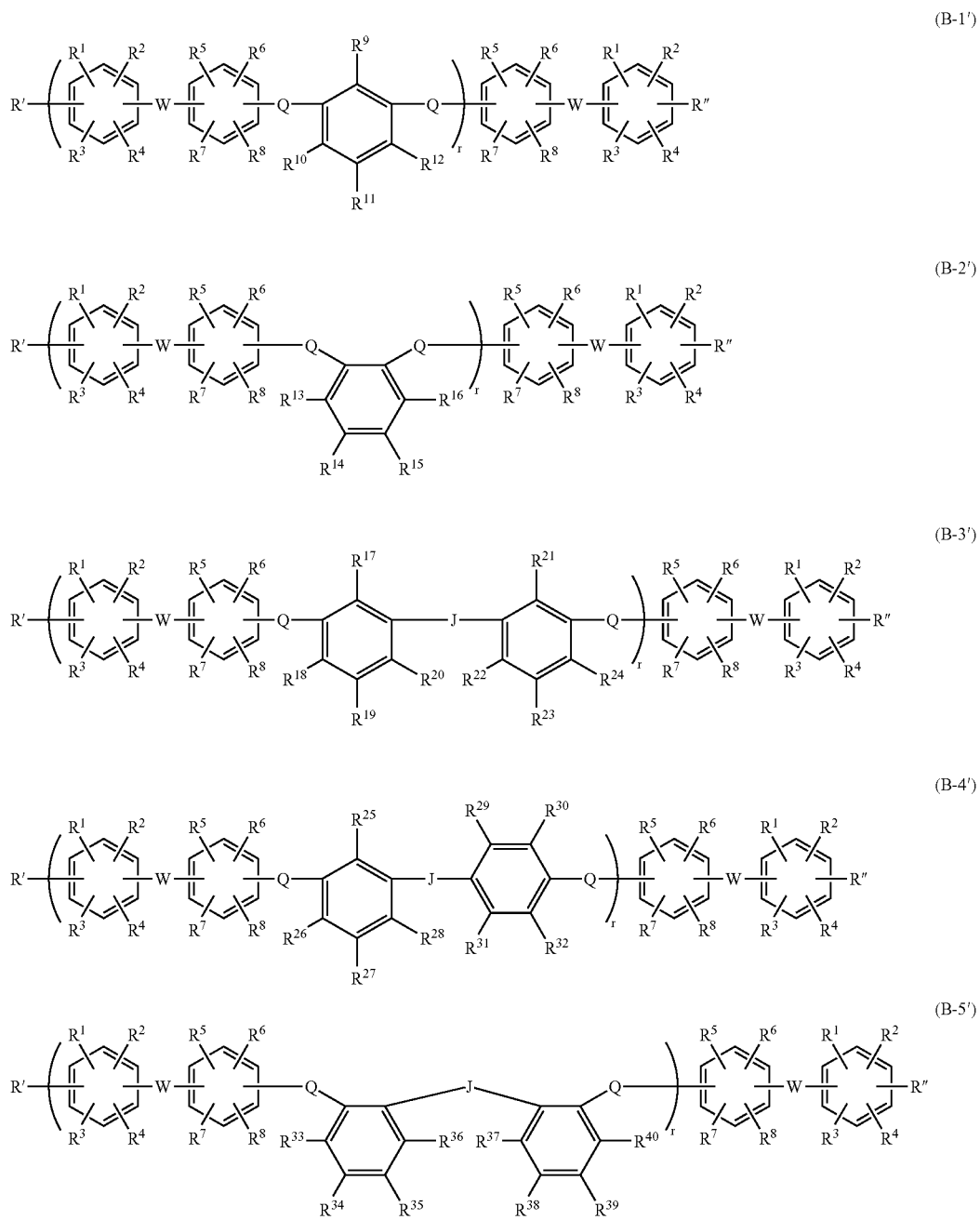

-continued (B-6')

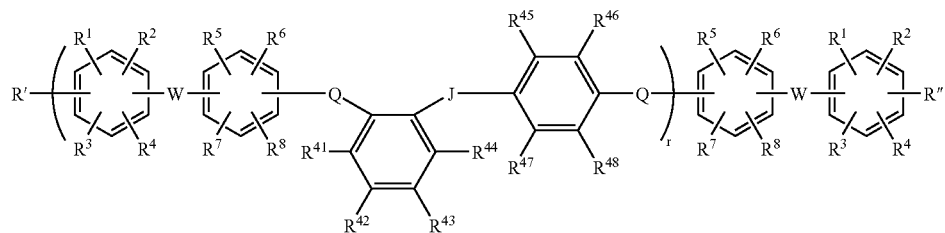

wherein $R^1$ to $R^{48}$, W, Q and J are the same as described in the formulae (B-1) (B-2), (B-3), (B-4), (B-5) and (B-6); r is the same as r in the formulae (B-1), (B-2), (B-3), (B-4), (B-5) and (B-6); and R' and R" are the same as described in the formula (A').

The present invention is characterized in that the specific structural unit is introduced in the aromatic main chain skeleton to provide bonding properties to electrodes and proccessability in hot press processing as well as thermal, mechanical and conductive properties inherent to the aromatic solid electrolytes.

Specific examples of the aromatic compounds represented by the formulae (B-1'), (B-2'), (B-3'), (B-4'), (B-5') and (B-6') include:

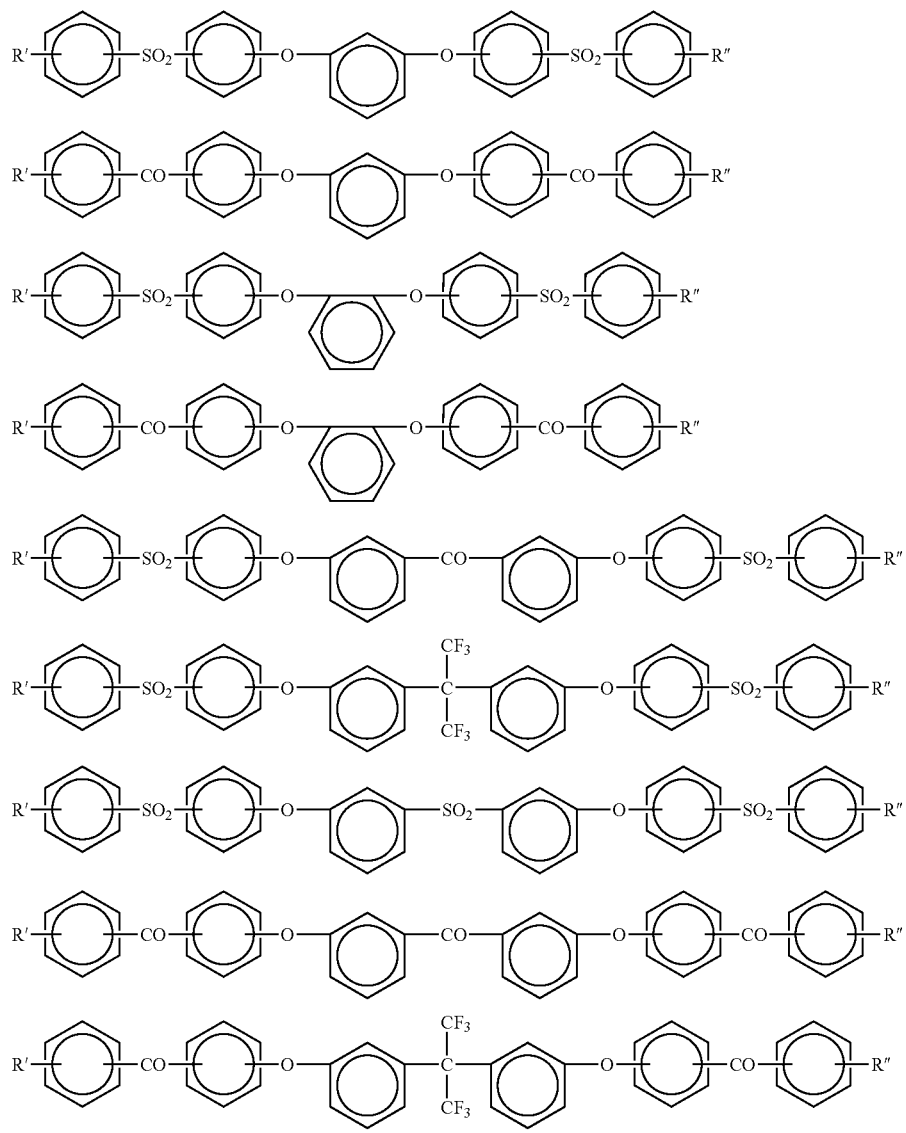

-continued
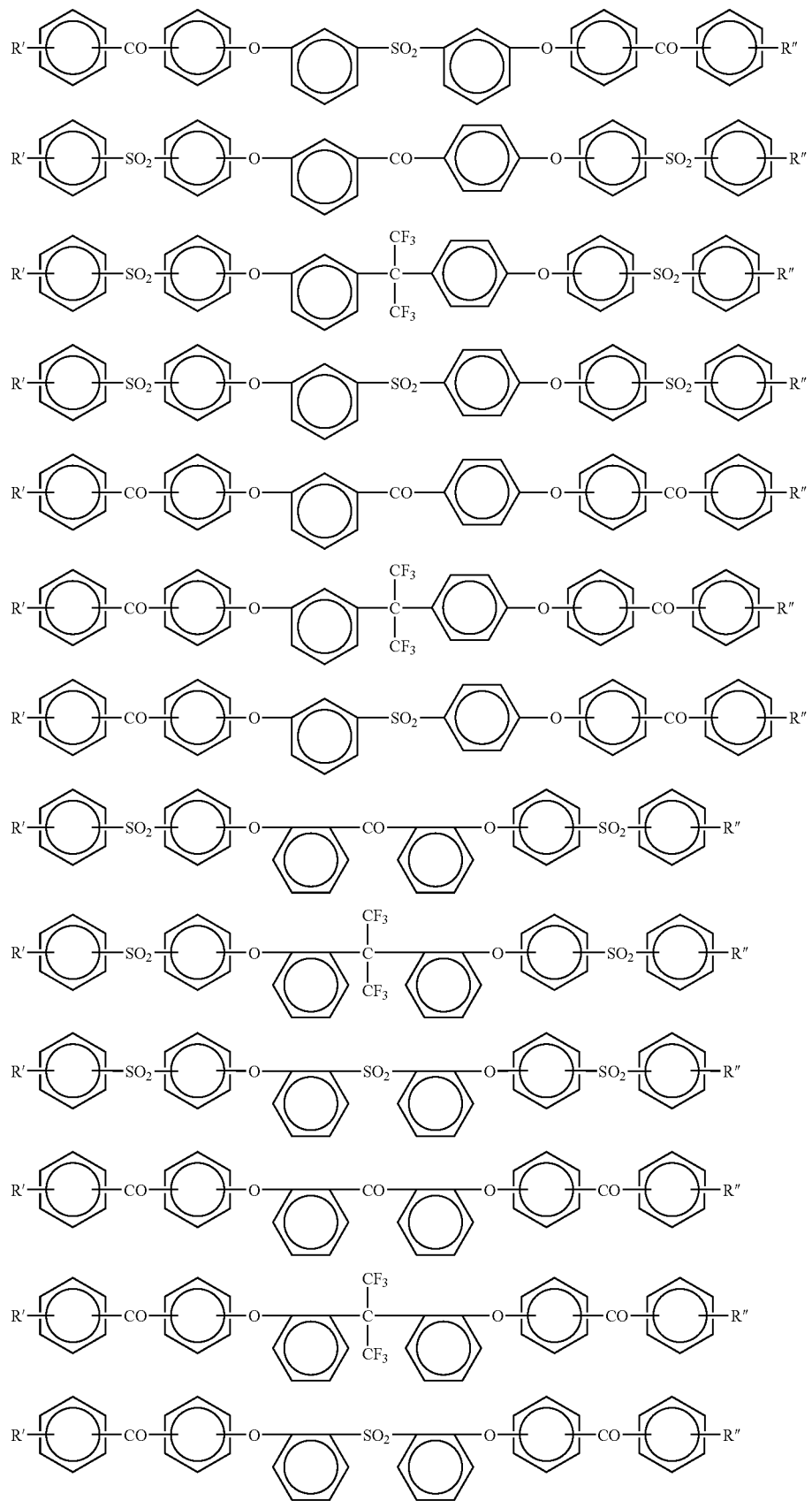

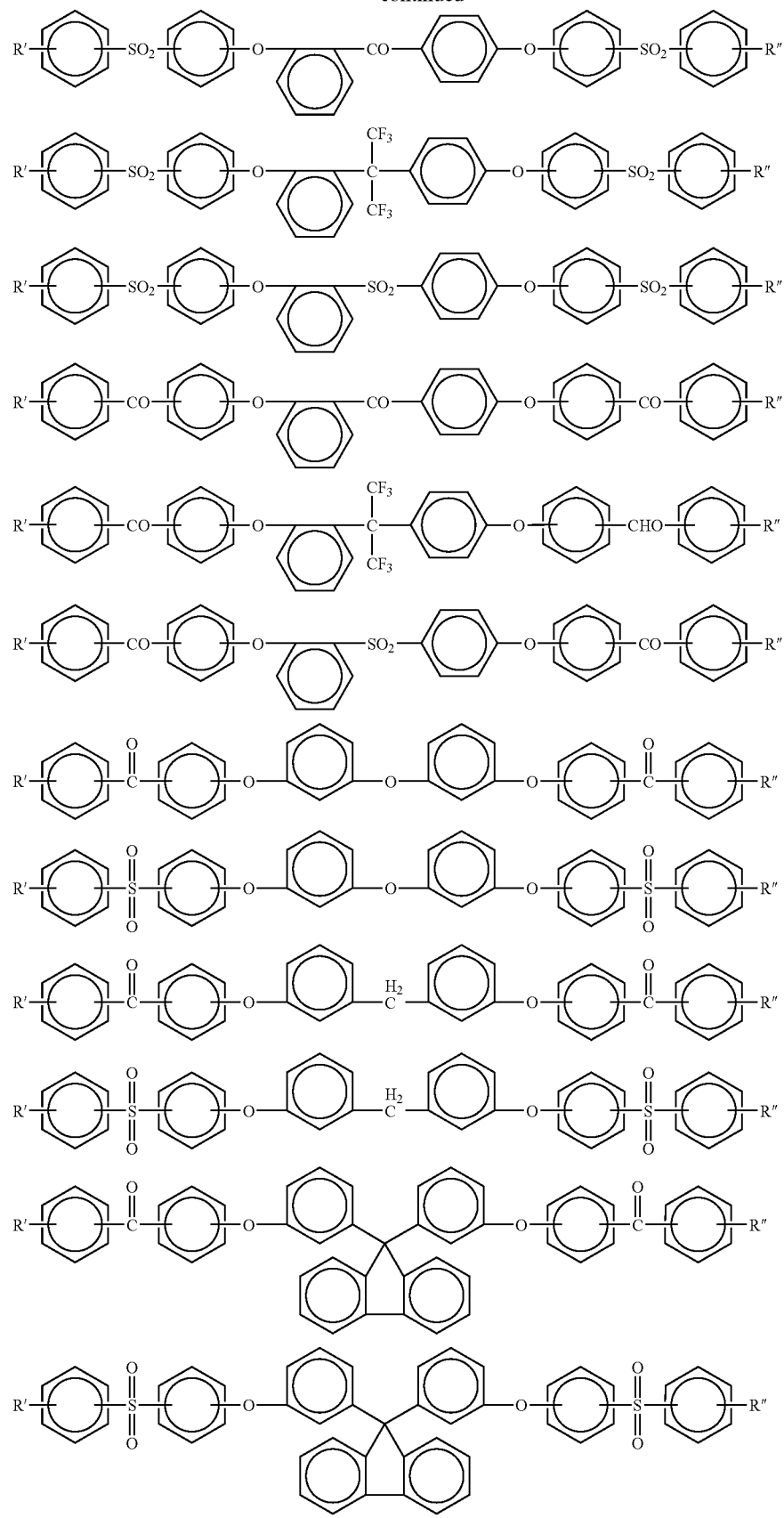

-continued
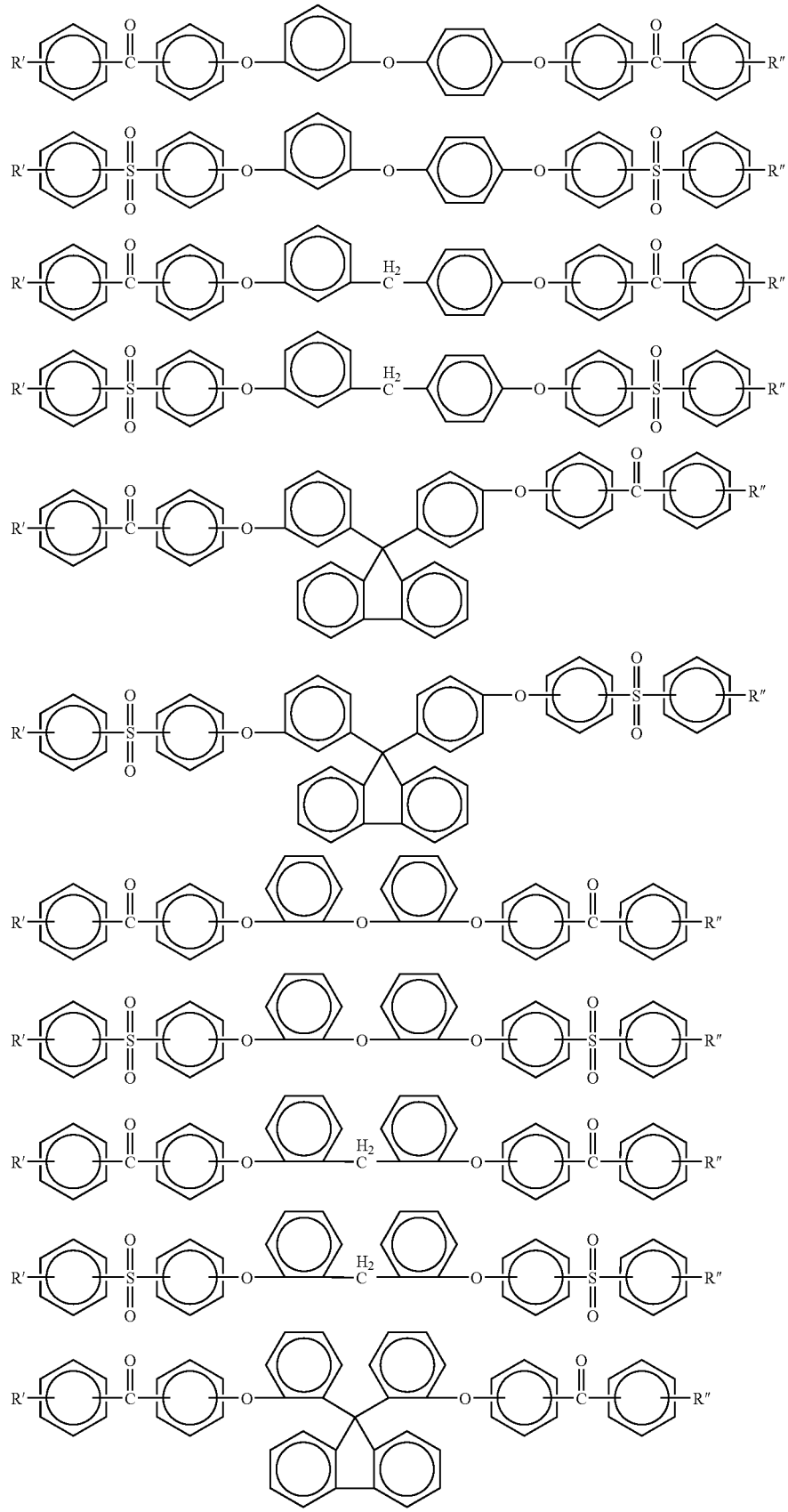

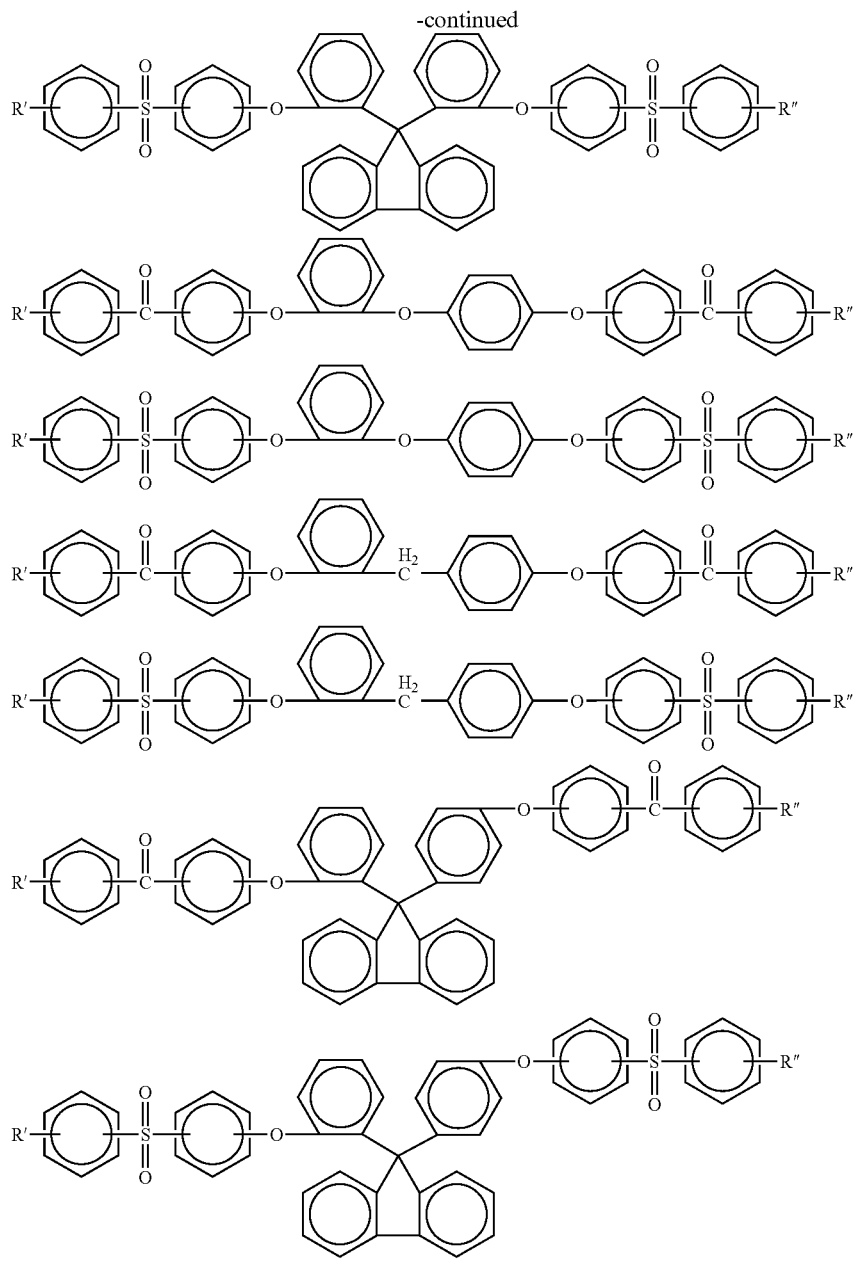

For example, the aromatic compounds represented by the formulae (B-1'), (B-2'), (B-3'), (B-4'), (B-5') and (B-6') may be synthesized by the process given below.

First, a bisphenol is converted into an alkali metal salt of bisphenol by reaction with an alkali metal such as lithium, sodium or potassium, or an alkali metal compound such as an alkali metal hydride, an alkali metal hydroxide or an alkali metal carbonate. This reaction is conducted in a polar solvent having high dielectric constant, such as N-methyl-2-pyrrolidone, N,N-dimethylacetamide, sulfolane, diphenyl sulfone or dimethyl sulfoxide. The alkali metal or the like is generally used in slight excess over the hydroxyl groups of the bisphenol, for example 1.1 to 2 times, preferably 1.2 to 1.5 times the equivalent weight of the hydroxyl groups.

Thereafter, the alkali metal salt of bisphenol is reacted with an aromatic dihalide compound activated by electron-withdrawing groups, in the presence of a solvent that forms an azeotrope with water, such as benzene, toluene, xylene, hexane, cyclohexane, octane, chlorobenzene, dioxane, tetrahydrofuran, anisole or phenetole. Examples of the above aromatic dihalide compound include 4,4'-difluorobenzophenone, 4,4'-dichlorobenzophenone, 4,4'-chlorofluorobenzophenone, 3,4'-difluorobenzophenone, 3,4'-dichlorobenzophenone, 3,4'-chlorofluorobenzophenone, 2,4'-difluorobenzophenone, 2,4'-dichlorobenzophenone, 2,4'-chlorofluorobenzophenone, bis(4-chlorophenyl)sulfone, bis(3-chlorophenyl)sulfone, bis(2-chlorophenyl)sulfone, bis(4-fluorophenyl)sulfone, 4-fluorophenyl-4'-chlorophenylsulfone, 4-fluorophenyl-3'-chlorophenylsulfone, 4-fluorophenyl-2'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,6-difluorobenzophenone, 2,5-difluorobenzophenone, 2,4-difluorobenzophenone, 2,6-dichlorobenzophenone, 2,5-dichlorobenzophenone, 2,4-dichlorobenzophenone and 1,3-bis(4-chlorobenzoyl)benzene. From the viewpoint of reactivity, the aromatic dihalide compound is desirably a fluorine compound. But taking the subsequent aromatic coupling reaction into consideration, the aromatic nucleophilic substitution reaction should be designed to take place so as to yield a molecule having a chlorine atom at its end(s). The active aromatic dihalide compound may be used in a molar amount 2 to 4 times, preferably 2.2 to 2.8 times that of the bisphenol. Before the aromatic nucleophilic substitution reaction, the bisphenol may be converted into an alkali metal salt thereof in advance. The reaction temperature is in the range of 60 to 300° C., preferably 80 to 250° C. The reaction time ranges from 15 minutes to 100 hours, preferably from 1 to 24 hours. Optimally, the active aromatic dihalide compound is a chlorofluoro compound that has two halogen atoms different in reactivity from each other. The use of this compound is advantageous in that the fluorine atom preferentially undergoes the nucleophilic substitution reaction with phenoxide so that the objective chlorine-terminated active compound may be obtained.

An alternative process for synthesizing the aromatic compound of the formula (B-1'), (B-2'), (B-3'), (B-4'), (B-5') or (B-6') is a combination of the nucleophilic substitution reaction with the electrophilic substitution reaction to synthesize an objective compound having flexibility comprising electron-withdrawing and electron-donating groups, as described in JP-A-H02-159.

Specifically, an aromatic dihalide compound activated by electron-withdrawing groups, such as bis (4-chlorophenyl) sulfone, is subjected to the nucleophilic substitution reaction with a phenol; thereafter the resultant bis-phenoxy substituted compound is subjected to Friedel-Crafts reaction with, for example, 3-chlorobenzoyl chloride to give an objective compound.

The aromatic dihalide compound activated by electron-withdrawing groups for use herein may be selected from the above-exemplified aromatic dihalide compounds. The phenol compound may be substituted, but is preferably unsubstituted from the viewpoints of heat resistance and flexibility. When substituted, the substituted phenol compound is preferably an alkali metal salt. Any of the alkali metal compounds described above can be used for the substitution reaction of the phenol compound. The alkali metal compound may be used in a molar amount 1.2 to 2 times that of the phenol. In the reaction, the aforesaid polar solvent or azeotropic solvent with water may be employed.

To obtain the objective compound, the bis-phenoxy compound is reacted with acylating agent chlorobenzoyl chloride in the presence of an activator of Lewis acids for the Friedel-Crafts reaction, such as aluminum chloride, boron trifluoride or zinc chloride. The chlorobenzoyl chloride is used in a molar amount 2 to 4 times, preferably 2.2 to 3 times that of the bis-phenoxy compound. The Friedel-Crafts reaction activator is used in a molar amount 1.1 to 2 times that of the active halide compound such as chlorobenzoic acid. The reaction time is in the range of 15 minutes to 10 hours, and the reaction temperature is in the range of –20 to 80° C. As a solvent, chlorobenzene, nitrobenzene or the like that is inactive in the Friedel-Crafts reaction may be used.

The aromatic compounds of the formula (B-1'), (B-2'), (B-3'), (B-4'), (B-5') or (B-6') in which r is 2 or greater may be synthesized by polymerization in accordance with the above-mentioned synthetic procedure of monomers. In this case, an alkali metal salt of bisphenol, which can supply ether oxygen as the electron-donating group Q in the formula (B') is subjected to substitution reaction with an excess of the activated aromatic halide such as 4,4'-dichlorobenzophenone or bis(4-chlorophenyl)sulfone, in the presence of a polar solvent such as N-methyl-2-pyrrolidone, N,N-dimethylacetamide or sulfolane. Examples of the bisphenols used in the above reaction include 2,2-bis(4-hydroxyphenyl)-1,1,1,3,3,3-hexafluoropropane, 2,2-bis(4-hydroxyphenyl)ketone, 2,2-bis (4-hydroxyphenyl) sulfone, 9,9-bis (4-hydroxyphenyl) fluorene, 9,9-bis(4-hydroxy-3-phenylphenyl)fluorene, 9,9-bis(4-hydroxy-3,5-diphenylphenyl) fluorene, 2-phenylphenol, 4,4'-bis(4-hydroxyphenyl)diphenylmethane, 4,4'-bis(4-hydroxy-3-phenylphenyl) diphenylmethane, 4,4'-bis(4-hydroxy-3,5-diphenylphenyl) diphenylmethane, 2-phenylhydroquinone, catechol, 3-methylcatechol, 4-methylcatechol, resorcinol, 2-methylresorcinol, 2,5-dimethylresorcinol, 4-ethylresorcinol, 2,2'-biphenol, 3,3'-biphenol, 2,4'-biphenol, 3,4'-biphenol, 2,2'-dihydroxydiphenylmethane, 3,3'-dihydroxydiphenylmethane, 2,4'-dihydroxydiphenylmethane, 3,4'-dihydroxydiphenylmethane, 2,2'-dihydroxydiphenylether, 3,3'-dihydroxydiphenylether, 2,4'-dihydroxydiphenylether, 3,4'-dihydroxydiphenylether, 2,2'-methylidenebis (4-methylphenol), 2,4'-methylidenebis(4-methylphenol), 2,4'-ethylidenebis(4-methylphenol), 2,2'-isopropylidenebisphenol, 2,3'-isopropylidenebisphenol, 2,4'-isopropylidenebisphenol, 3,3'-methylidenebis(1,1'-biphenyl-4-ol) and 9,9'-bis(2-hydroxy-4-methylphenyl)fluorene.

Examples of such aromatic compounds include those represented by the following formulae:

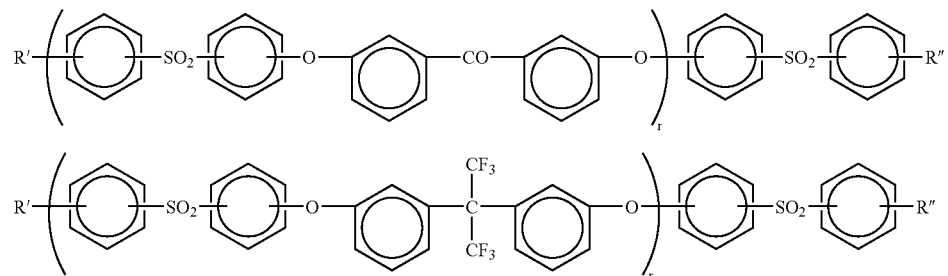

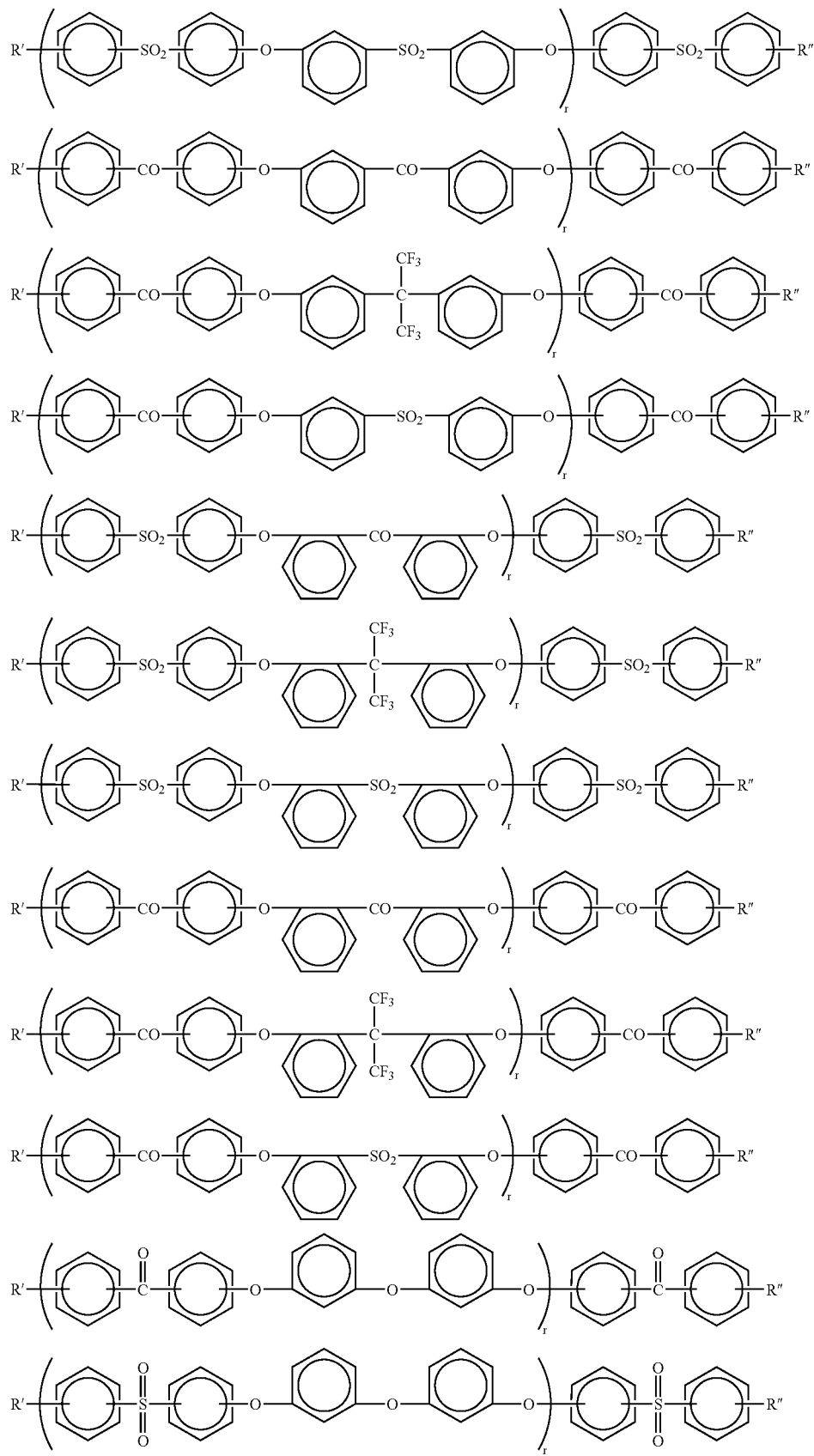

-continued
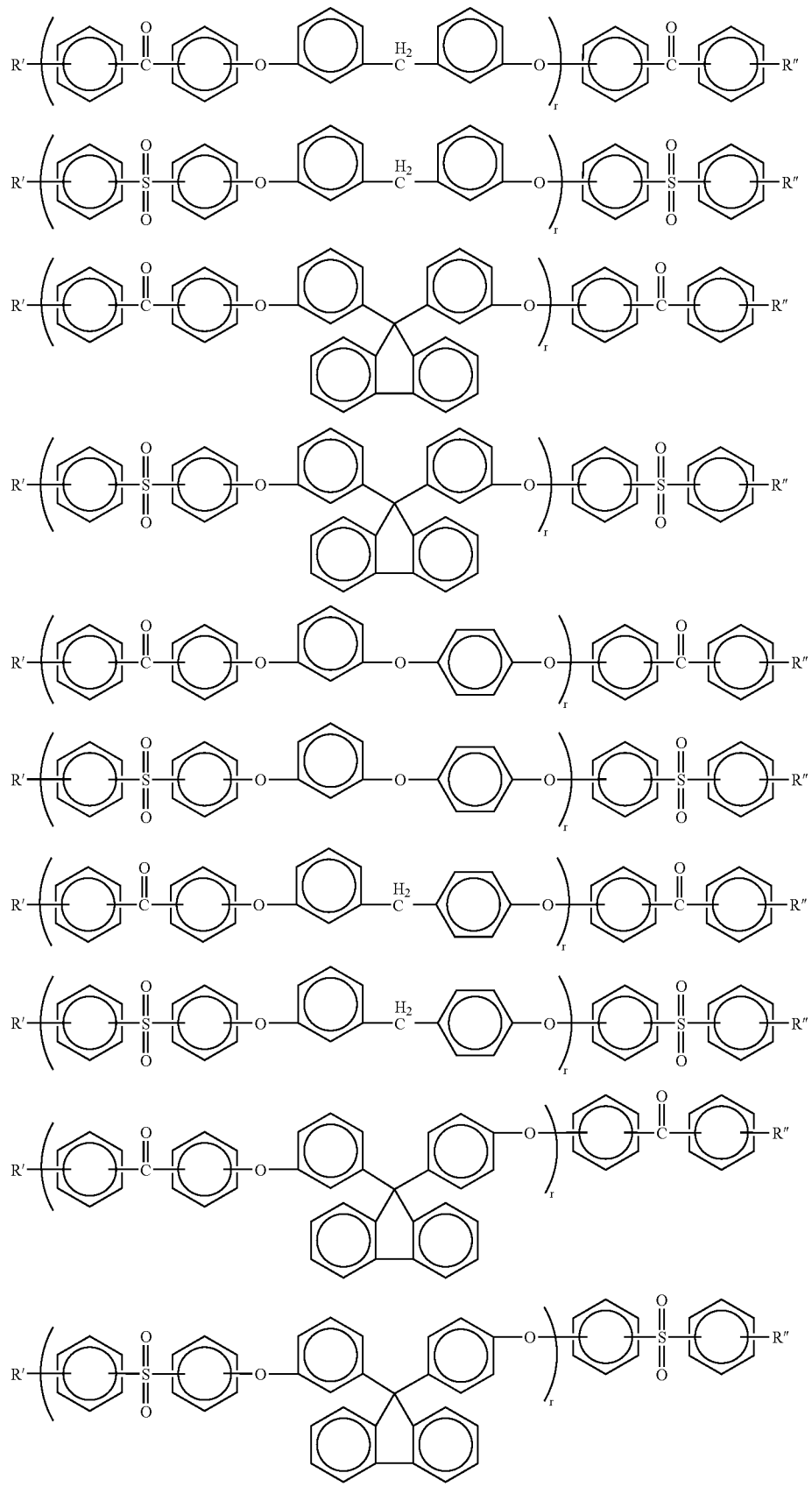

-continued
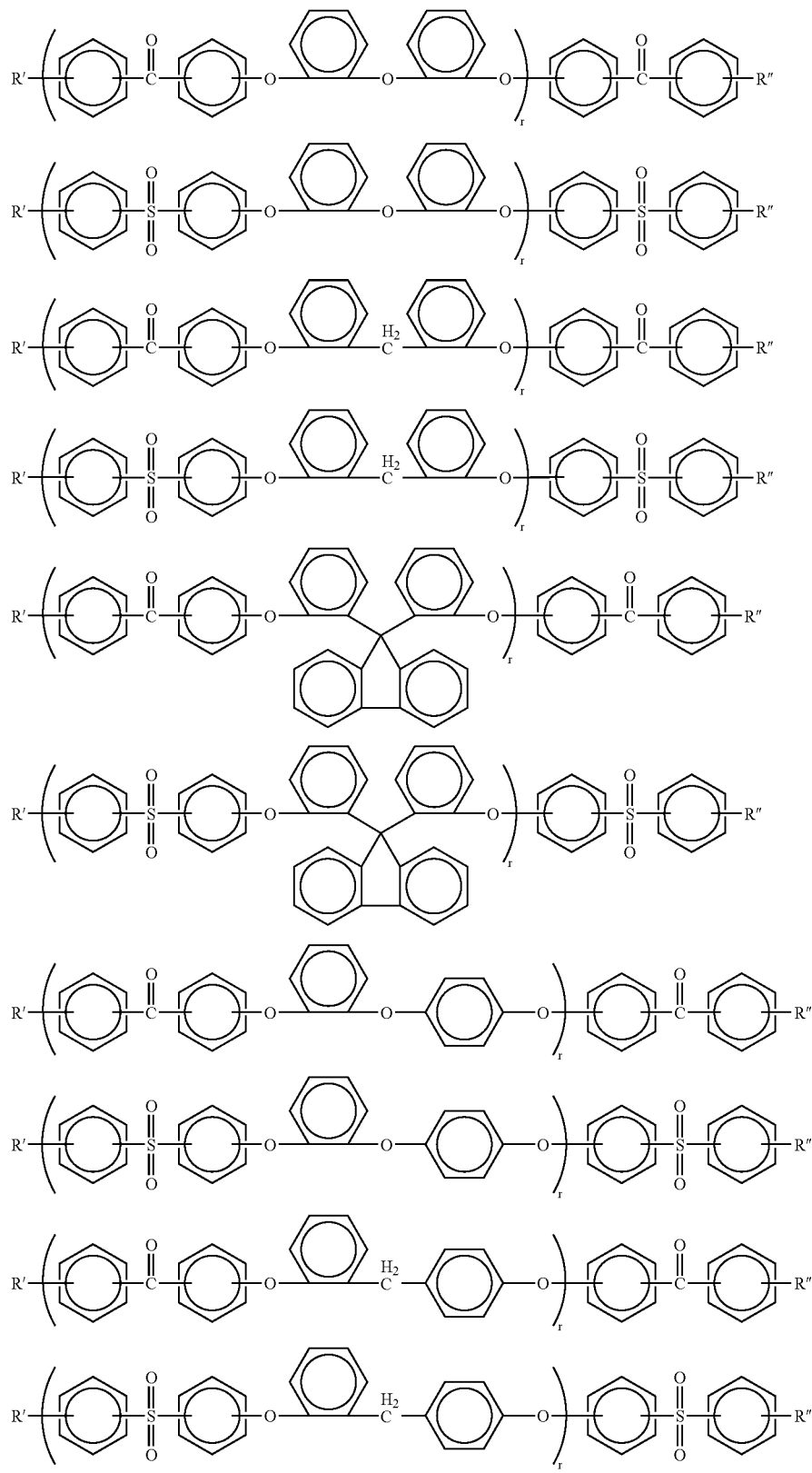

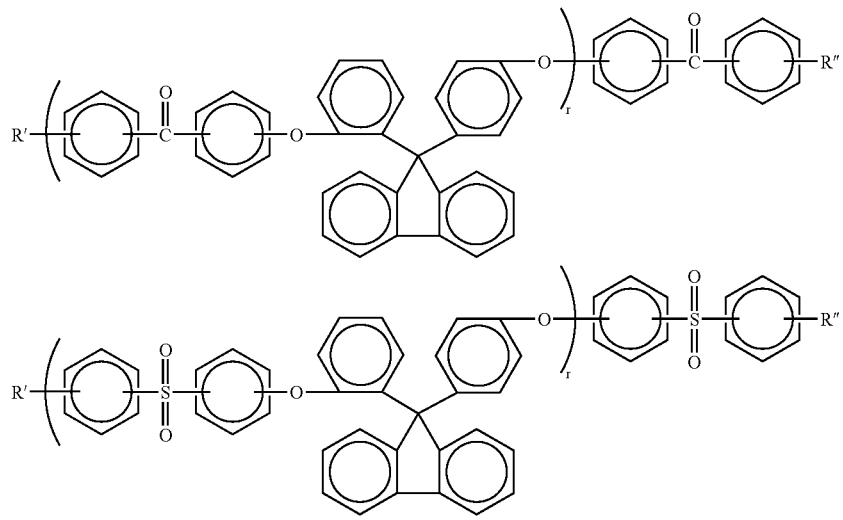

The aromatic compounds represented by the formulae (B-1'), (B-2'), (B-3'), (B-4'), (B-5') and (B-6') may be used singly or in combination.

(Synthesis of Sulfonic Group-Containing Polyarylene Block Copolymer)

For the synthesis of the sulfonic group-containing polyarylene block copolymer, the monomer units (inclusive of precursors) are polymerized in the presence of a catalyst. The catalyst used herein is a catalyst system containing a transition metal compound. This catalyst system essentially contains (1) a transition metal salt and a compound which functions as a ligand (referred to as the "ligand component" hereinafter), or a transition metal complex (inclusive of copper salt) to which ligands are coordinated, and (2) a reducing agent. A "salt" may be added to increase the polymerization rate.

Examples of the transition metal salts include nickel compounds such as nickel chloride, nickel bromide, nickel iodide and nickel acetylacetonate; palladium compounds such as palladium chloride, palladium bromide and palladium iodide; iron compounds such as iron chloride, iron bromide and iron iodide; and cobalt compounds such as cobalt chloride, cobalt bromide and cobalt iodide. Of these, nickel chloride and nickel bromide are particularly preferred.

Examples of the ligand components include triphenylphosphine, 2,2'-bipyridine, 1,5-cyclooctadiene and 1,3-bis(diphenylphosphino)propane. Of these, triphenylphosphine and 2,2'-bipyridine are preferred. The ligand components may be used singly or in combination of two or more kinds.

Examples of the transition metal complexes in which ligands are coordinated include bis(triphenylphosphine)nickel chloride, bis(triphenylphosphine)nickel bromide, bis(triphenylphosphine)nickel iodide, bis(triphenylphosphine) nickel nitrate, (2,2'-bipyridine)nickel chloride, (2,2'-bipyridine)nickel bromide, (2,2'-bipyridine)nickel iodide, (2,2'-bipyridine)nickel nitrate, bis(1,5-cyclooctadiene) nickel, tetrakis(triphenylphosphine)nickel, tetrakis(triphenylphosphito)nickel and tetrakis(triphenylphosphine)palladium. Of these, bis(triphenylphosphine)nickel chloride and (2,2'-bipyridine)nickel chloride are preferred.

Examples of the reducing agents employable in the aforesaid catalyst system include iron, zinc, manganese, aluminum, magnesium, sodium and calcium. Of these, zinc, magnesium and manganese are preferable. These reducing agents may be used in a more activated form by being contacted with an acid such as an organic acid.

Examples of the "salts" employable in the catalyst system include sodium compounds such as sodium fluoride, sodium chloride, sodium bromide, sodium iodide and sodium sulfate; potassium compounds such as potassium fluoride, potassium chloride, potassium bromide, potassium iodide and potassium sulfate; and ammonium compounds such as tetraethylammonium fluoride, tetraethylammonium chloride, tetraethylammonium bromide, tetraethylammonium iodide and tetraethylammonium sulfate. Of these, sodium bromide, sodium iodide, potassium bromide, tetraethylammonium bromide and tetraethylammonium iodide are preferred.

The amounts in which the above components are used are as follows. The transition metal salt or the transition metal complex is usually used in an amount of 0.0001 to 10 mol, preferably 0.01 to 0.5 mol per mol of the monomer units used in the polymerization. If the amount is less than 0.0001 mol, the polymerization may not proceed sufficiently. On the other hand, the amount exceeding 10 mol may result in a lowered molecular weight of the copolymer.

When the catalyst system contains the transition metal salt and the ligand component, the amount of the ligand component is usually 0.1 to 100 mol, preferably 1 to 10 mol per mol of the transition metal salt. If the amount is less than 0.1 mol, the catalytic activity may become insufficient. On the other hand, the amount exceeding 100 mol may result in a lowered molecular weight of the copolymer.

The amount of the reducing agent is usually in the range of 0.1 to 100 mol, preferably 1 to 10 mol per mol of the monomer units used in the polymerization. If the reducing agent is used in an amount less than 0.1 mol, the polymerization may not proceed sufficiently. On the other hand, the amount thereof exceeding 100 mol may result in difficult purification of the resulting polymer.

When the "salt" is used, the amount thereof is usually in the range of 0.001 to 100 mol, preferably 0.01 to 1 mol per mol of the monomer units used in the polymerization. The use of the salt in an amount less than 0.001 mol may lead to an insufficient effect of increasing the polymerization rate. On the other hand, the amount thereof exceeding 100 mol may result in difficult purification of the polymer obtained.

Suitable polymerization solvents include tetrahydrofuran, cyclohexanone, dimethyl sulfoxide, N,N-dimethylformamide, N,N-dimethylacetamide, N-methyl-2-pyrrolidone, γ-butyrolactone and N,N'-dimethylimidazolidinone. Of these, tetrahydrofuran, N,N-dimethylformamide, N,N-dimethylacetamide, N-methyl-2-pyrrolidone and N,N'-dimethylimidazolidinone are preferred. These polymerization solvents are desirably used after dried sufficiently.

The concentration of the monomer units in the polymerization solvent is usually in the range of 1 to 90% by mass, preferably 5 to 40% by mass.

The polymerization temperature is generally in the range of 0 to 200° C., preferably 50 to 120° C., and the polymerization time generally ranges from 0.5 to 100 hours, preferably from 1 to 40 hours.

(Sulfonic Group-Containing Polyarylene Block Copolymer)

The sulfonic group-containing polyarylene block copolymer of the present invention may be obtained by hydrolyzing the sulfonic group-free polyarylene to convert the sulfonate group (—$SO_3$R) in the compound of the formula (A') into the sulfonic group (—$SO_3$H)

For example, the hydrolysis may be performed by any of the following methods:

(1) The sulfonic group-free polyarylene is added to an excess of water or an alcohol that contains a small amount of hydrochloric acid, and the mixture is stirred for at least 5 minutes.

(2) The sulfonic group-free polyarylene is reacted in trifluoroacetic acid at about 80 to 120° C. for about 5 to 10 hours.

(3) The sulfonic group-free polyarylene is reacted at about 80 to 150° C. for about 3 to 10 hours in a solution such as N-methylpyrrolidone that contains lithium bromide in a molar amount 1 to 3 times that of the sulfonate groups (—$SO_3$R) of the polyarylene, followed by addition of hydrochloric acid.

Alternatively, the sulfonic group-containing polyarylene block copolymer according to the present invention may be obtained by copolymerizing a monomer of the same skeleton as the sulfonate represented by the formula (A') except having no sulfonate group with an oligomer represented by the formula (B-1'), (B-2'), (B-3'), (B-4'), (B-5') or (B-6'), and sulfonating the thus-synthesized polyarylene having no sulfonate group or sulfonic group. That is to say, the sulfonic group-free polyarylene is produced by the above-described synthetic procedure and is treated with a sulfonating agent to introduce the sulfonic group in the sulfonic group-free polyarylene. The sulfonic group-containing polyarylene may be thus obtained.

The sulfonation may be performed by treating the sulfonic group-free polyarylene with a sulfonating agent in the absence or presence of a solvent by a common method to introduce the sulfonic group.

For introduction of the sulfonic groups, the sulfonic group-free polyarylene may be treated with a conventional sulfonating agent, such as sulfuric anhydride, fuming sulfuric acid, chlorosulfonic acid, sulfuric acid or sodium bisulfite, under known conditions. (See Polymer Preprints, Japan, vol. 42, No. 3, p. 730 (1993), Polymer Preprints, Japan, vol. 43, No. 3, p. 736 (1994), and Polymer Preprints, Japan, vol. 42, No. 7, pp. 2490-2492 (1993).)

The solvents employable in the sulfonation include hydrocarbon solvents such as n-hexane; ether solvents such as tetrahydrofuran and dioxane; aprotic polar solvents such as dimethylacetamide, dimethylformamide and dimethyl sulfoxide; and halogenated hydrocarbons such as tetrachloroethane, dichloroethane, chloroform and methylene chloride. The reaction temperature is not particularly limited, but is usually in the range of −50 to 200° C., preferably −10 to 100° C. The reaction time is usually 0.5 to 1,000 hours, preferably 1 to 200 hours.

The sulfonic group-containing polyarylene block copolymer of the present invention generally contains the sulfonic groups in an amount of 0.3 to 5.0 meq/g, preferably 0.5 to 3.0 meq/g, more preferably 0.8 to 2.8 meq/g. If the amount of sulfonic group is less than 0.3 meq/g, the proton conductivity will be low. On the other hand, the amount of sulfonic group exceeding 5.0 meq/g increases hydrophilicity such that the solvent resistance is drastically deteriorated and is unfavorable.

The amount of sulfonic group may be manipulated by changing the amounts, types and combination of the monomer for forming the structural unit (a) and the monomer for forming the repeating unit (b-1), (b-2), (b-3), (b-4), (b-S) or (b-6)

The precursor of sulfonic group-containing polyarylene block copolymer of the present invention, namely the base polymer free from induction or introduction of the sulfonic acid has a weight-average molecular weight in terms of polystyrene of 10,000 to 1,000,000, preferably 20,000 to 800,000. When the weight-average molecular weight is less than 10,000, insufficient film properties are encountered such as cracked films, and strength characteristics are also unsatisfactory. On the other hand, the polymer having a weight-average molecular weight exceeding 1,000,000 shows insufficient solubility, and has a high solution viscosity to cause bad proccessability.

The structure of the sulfonic group-containing polyarylene block copolymer may be identified from its infrared absorption spectrum, for example based on the C—O—C absorption at 1230 to 1250 $cm^{-1}$ and the C=O absorption at 1640 to 1660 $cm^{-1}$. The structure may be identified also from the peaks assigned to aromatic protons at 6.8-8.5 ppm in the nuclear magnetic resonance spectrum ($^1$H-NMR)

(Solid Polymer Electrolyte)

The solid polymer electrolyte of the present invention comprises the sulfonic group-containing polyarylene block copolymer as described above.

The solid polymer electrolyte of the present invention can be suitably used as electrolytes for primary and secondary cells, solid polymer electrolytes for fuel cells, electrolytes for direct methanol fuel cells, display elements, sensors, signaling media, solid condensers and ion exchange membranes.

(Proton Conductive Membrane)

For example, the proton conductive membrane of the present invention may be manufactured by a casting process in which the sulfonic group-containing polyarylene block copolymer dissolved in a solvent is casted on a substrate to form a film. The substrate used herein is not particularly limited and may be selected from those substrates commonly used in the solvent casting processes. Examples thereof include plastic substrates and metal substrates. Preferably, thermoplastic resin substrates such as polyethyleneterephthalate (PET) films are used.

In the production of the proton conductive membrane, the sulfonic group-containing polyarylene block copolymer may be used in combination with inorganic acids such as sulfuric acid and phosphoric acid, organic acids including carboxylic acids, an appropriate amount of water, and the like.

The solvents to dissolve the sulfonic group-containing polyarylene block copolymer include aprotic polar solvents such as N-methyl-2-pyrrolidone, N,N-dimethylformamide, γ-butyrolactone, N,N-dimethylacetamide, dimethylsulfoxide, dimethylurea and dimethylimidazolidinone (DMI). Particularly, in view of dissolubility and solution viscosity, N-methyl-2-pyrrolidone is preferable. The aprotic polar solvents may be used singly or in combination of two or more kinds.

The solvent for dissolving the sulfonic group-containing polyarylene block copolymer may be a mixture of the above aprotic polar solvent and an alcohol. Exemplary alcohols include methanol, ethanol, propyl alcohol, iso-propyl alcohol, sec-butyl alcohol and tert-butyl alcohol. In particular, methanol is preferable since it ensures an appropriately low solution viscosity over a wide range of proportions of the copolymer. These alcohols may be used singly or in combination of two or more kinds.

The above mixed solvent will contain the aprotic polar solvent in an amount of 25 to 95% by mass, preferably 25 to 90% by mass, and the alcohol in an amount of 5 to 75% by mass, preferably 10 to 75% by mass. This proportion of the alcohol leads to an appropriately low solution viscosity.

Although the concentration of the sulfonic group-containing polyarylene block copolymer in the solution (i.e. the polymer concentration) depends on the molecular weight of the copolymer, it is generally from 5 to 40% by mass, preferably from 7 to 25% by mass. The polymer concentration less than 5% by mass causes difficulties in producing the membrane in large thickness and results in easy occurrence of pinholes. On the other hand, when the polymer concentration exceeds 40% by mass, the solution viscosity becomes so high that the film production will be difficult and further that the obtained film may have low surface smoothness.

The solution viscosity may vary depending on the molecular weight of the sulfonic group-containing polyarylene block copolymer or the polymer concentration. Generally, it ranges from 2,000 to 100,000 mPa·s, preferably from 3,000 to 50,000 mPa·s. When the solution viscosity is less than 2,000 mPa·s, the solution will have bad retentivity and may spill out from the substrate during the membrane production. On the other hand, the solution viscosity over 100,000 mPa·s is so high in viscosity that the solution cannot be extruded through a die and the film production by casting process may be difficult.

The wet film obtained as described above may be immersed into water to substitute the organic solvent remaining in the film with water. This treatment enables reduction of the amount of residual solvent in the resultant proton conductive membrane.

Prior to the immersion into water, the wet film may be predried. The predrying may be performed by subjecting the wet film at 50 to 150° C. for 0.1 to 10 hours.

Immersing the wet films in water may be carried out batchwise with respect to each sheet, or may be a continuous process where the films, which may be in the form of laminate with a substrate film (e.g. PET film) as produced or which may be released from the substrate, are immersed in water and then wound sequentially.

In the batchwise immersion, the films to be treated are suitably framed to prevent wrinkles from forming on the surface of treated films.

The immersion will be suitably made such that the wet films contact with water in an amount of at least 10 parts by mass, preferably at least 30 parts by mass based on 1 part by mass of the wet films. This contact ratio is suitably as large as possible to minimize the amount of solvent remaining in the proton conductive membrane. In order to reduce the residual solvent in the proton conductive membrane, it is also effective to keep the concentration of the organic solvent in water at or below a certain level by renewing the water used in the immersion or by overflowing water. The in-plane distribution of the residual organic solvent within the proton conductive membrane may be desirably uniformed by homogenizing the organic solvent concentration in the water by stirring or the like.

When the wet film is immersed in water, the water preferably has a temperature of 5 to 80° C. Although the substitution between the organic solvent and water can take place at a higher rate as the water temperature rises, the water absorption of the film also increases at higher temperatures. Accordingly, there is a concern that the proton conductive membrane has a rough surface after dried. In general, the water temperature is suitably 10 to 60° C. from the viewpoints of the substitution rate and easy handling.

The immersion time varies depending on the initial amount of residual solvent, the contact ratio and the water temperature. Generally, the immersion time ranges from 10 minutes to 240 hours, preferably from 30 minutes to 100 hours.

Drying the water-immersed film results in a proton conductive membrane that has a reduced amount of residual solvent, generally not more than 5% by mass.

Controlling the immersion conditions enables further reduction of the residual solvent down to 1% by mass or less in the proton conductive membrane. For example, this is possible when the wet film is immersed in water that is at least 50 parts by mass based on 1 part by mass of the wet film, at a water temperature of 10 to 60° C. and for 10 minutes to 10 hours.

After the wet film has been immersed in water as described above, the film is dried at 30 to 100° C., preferably 50 to 80° C., for 10 to 180 minutes, preferably 15 to 60 minutes. Subsequently, it is vacuum dried at 50 to 150° C. for 0.5 to 24 hours and preferably at a vacuum of 500 to 0.1 mmHg. The proton conductive membrane according to the present invention may be thus obtained.

The proton conductive membrane ranges usually in dry thickness from 10 to 100 μm, preferably from 20 to 80 μm.

The proton conductive membrane may contain an anti-aging agent, preferably a hindered phenol compound having a molecular weight of 500 or more. The anti-aging agent provides further enhanced durability of the proton conductive membrane.

The hindered phenol compounds having a molecular weight of 500 or more include triethylene glycol-bis[3-(3-t-butyl-5-methyl-4-hydroxyphenyl)propionate] (trade name: IRGANOX 245), 1,6-hexanediol-bis[3-(3,5-di-t-butyl-4-hydroxyphenyl) propionate] (trade name: IRGANOX 259), 2,4-bis-(n-octylthio)-6-(4-hydroxy-3,5-di-t-butylanilino)-3,5-triadine (trade name: IRGANOX 565), pentaerythrithyl-tetrakis[3-(3,5-di-t-butyl-4-hydroxyphenyl)propionate] (trade name: IRGANOX 1010), 2,2-thio-diethylenebis[3-(3,5-di-t-butyl-4-hydroxyphenyl)propionate] (trade name: IRGANOX 1035), octadecyl-3-(3,5-di-t-butyl-4-hydroxyphenyl)propionate (trade name: IRGANOX 1076), N,N-hexamethylenebis (3,5-di-t-butyl-4-hydroxy-hydrocinnamide) (trade name: IRGANOX 1098), 1,3,5-trimethyl-2,4,6-tris(3,5-di-t-butyl-4-hydroxybenzyl)benzene (trade name: IRGANOX 1330), tris-(3,5-di-t-butyl-4-hydroxybenzyl)-isocyanurate (trade name: IRGANOX 3114) and 3,9-bis[2-[3-(3-t-butyl-4-hydroxy-5-methylphenyl)propionyloxy]-1,1-dimethylethyl]-2,4,8,10-tetraoxaspiro[5.5]undecane (trade name: Sumilizer GA-80).

The hindered phenol compound is preferably used in an amount of 0.01 to 10 parts by mass per 100 parts by mass of the sulfonic group-containing polyarylene block copolymer.

The proton conductive membrane of the present invention is excellent in resistance to hot water, solvents, heat and oxidation, tenacity, electrode-bonding properties and processability, while maintaining high proton conductivity. Accordingly, the proton conductive membrane can be suitably used in fuel cells for household power supply, automobiles, cellular phones, personal computers, mobile terminals, digital cameras, portable CD and MD players, headphone stereos, mechanical pets, electric assisted bicycles, electric scooters and DMFCs.

EXAMPLES

The present invention will be hereinafter described in greater detail by Examples presented below, but it should be construed that the invention is in no way limited to those Examples.

In Examples, the equivalent of sulfonic acid, molecular weight, proton conductivity, thermal properties and other properties were measured and evaluated as described below.

1. Equivalent of Sulfonic Acid (IEC)

The sulfonic group-containing polyarylene block copolymer was washed until the wash water became neutral, and free residual acids were sufficiently removed. The copolymer was then dried. A predetermined amount of the copolymer was weighed out and was dissolved in a THF/water mixed solvent. The resultant solution was mixed with phenolphthalein as an indicator and then titrated with an NaOH standard solution to obtain a point of neutralization, from which the equivalent of sulfonic acid was determined.

2. Measurement of Molecular Weight

The polyarylene or oligomer having no sulfonic group was basically determined for number-average molecular weight and weight-average molecular weight in terms of polystyrene by GPC using tetrahydrofuran (THF) as a solvent. The sulfonic group-containing polyarylene block copolymer was basically determined for number-average molecular weight and weight-average molecular weight in terms of polystyrene by GPC using a solvent (eluting solution) consisting of N-methyl-2-pyrrolidone (NMP) mixed with lithium bromide and phosphoric acid.

3. Measurement of Proton Conductivity

An alternating-current resistance was determined as follows. Platinum wires ($\phi$=0.5 mm) were pressed against a surface of a proton conductive membrane sample in the form of a strip having a width of 5 mm. The sample was held in a constant-temperature constant-humidity apparatus, and an alternating-current impedance between platinum wires was measured to determine proton conductivity. That is to say, an impedance at an alternating current of 10 kHz in the environment of a temperature of 85° C. and a relative humidity of 90% was measured. As a resistance measuring device, a chemical impedance measuring system manufactured by NF Corporation was used, and as a constant-temperature constant-humidity apparatus, JW 241 manufactured by Yamato Scientific Co., Ltd. was used. Five platinum wires were pressed at intervals of 5 mm, and the distance between wires (wire distance) was changed from 5 to 20 mm to measure alternating-current resistance. From the wire distance and the gradient of resistance, specific resistance R of the membrane was calculated, then from the reciprocal number of the specific resistance R, proton conductivity was calculated.

Specific resistance R ($\Omega \cdot cm$)=0.5 (cm)×membrane thickness (cm)×resistance wire gradient ($\Omega$/cm)

4. Evaluation of Thermal Properties

The oligomer synthesized was evaluated for thermal properties by DSC and TGA. The oligomer's Tg was determined by reading the value of second scan in DSC, and the heat resistance by reading the 5 wt % loss temperature in TGA. The sample used in the evaluation was the solid polymer as obtained, and DSC and TGA were performed in a nitrogen atmosphere at a heating rate of 20° C./min.

5. Evaluation of Other Properties

A 50 cc screw tube was charged with 5.0 g of a sulfonic group-containing polymer, 20.6 g of NMP and 10.3 g of methanol, followed by stirring with a wave rotor for 24 hours to prepare a uniform polymer solution. The solution was casted on a PET film with a bar coater, and dried at 80° C. for 30 minutes and at 150° C. for 60 minutes to give a uniform and transparent proton conductive membrane specimen having a thickness of 40 μm. The film was washed twice with pH 1 hydrochloric acid water and five times with pH 5 water, and was thereafter air dried for a day to provide a sample. The film sample was measured for inflection point in dynamic viscoelasticity measurement ('E: frequency 10 Hz), and breaking strength and elongation in a tensile test.

Electrode-bonding properties were evaluated as follows. The film was hot pressed against a commercially available carbon electrode at 140° C. for 5 minutes at a pressure of 75 kgf/cm$^2$, and thereafter the carbon electrode was peeled. The transfer ratio of the carbon electrode to the sample was determined to evaluate electrode-bonding properties. The electrode transfer ratio was read by scanning the treated sample surface and calculating the appropriate area ratio of contrasts of the conductive membrane and electrode.

Synthetic Example 1

Preparation of Aromatic Compound (Oligomer)

A 1-liter three-necked flask equipped with a stirrer, a thermometer, a cooling tube, a Dean-Stark tube and a three-way nitrogen inlet cock, was charged with 73.05 g (0.335 mol) of 4,4'-difluorobenzophenone, 12.85 g (0.055 mol) of 4-chloro-4'-fluorobenzophenone, 40.21 g (0.365 mol) of resorcinol, 55.52 g (0.402 mol) of potassium carbonate, 390 ml of N,N-dimethylacetamide (DMAc) and 160 ml of toluene. With the flask in an oil bath, the ingredients were reacted by being stirred in a nitrogen atmosphere at 140° C. Reaction was carried out while the water resulting from the reaction was removed as an azeotrope with toluene from the system through the Dean-Stark tube. Water almost ceased to generate in about 3 hours, and most of the toluene was removed while gradually raising the reaction temperature to 150° C. After reaction had been carried out for 5 hours, 8.57 g (0.037 mol) of 4-chloro-4'-fluorobenzophenone was added to carry out reaction for another 2 hours at 150° C. Subsequently, the reaction liquid obtained was cooled by standing and was filtered to remove precipitated by-product inorganic compounds. The filtrate was poured into 2 L of methanol to precipitate the product. The precipitated product was filtered off, recovered, dried and dissolved in 500 ml of DMAc. The resultant solution was poured into 2 L of methanol to perform reprecipitation. Thus, 90.5 g of an objective compound was obtained (92% yield)

GPC (THF solvent) provided that the polymer obtained had a number-average molecular weight in terms of polystyrene of 5,000. The polymer was found to be soluble in NMP and THF, and to have Tg of 130° C. and a thermal decomposition temperature Td5 of 425° C.

The structure of the polymer obtained is probably represented by the formula (I) below:

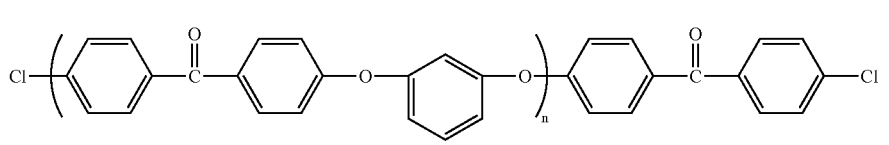

Synthetic Example 2

Reaction was conducted in the same manner as in Synthetic Example 1, except that resorcinol was replaced with 73.42 g (0.367 mol) of 2,2'-dihydroxydiphenylmethane, 72.73 g (0.333 mol) of 4,4'-difluorobenzophenone, and 21.30 g (0.060 mol) for initial addition and 9.30 g (0.040 mol) for subsequent addition of 4-chloro-4'-fluorobenzophenone. Thus, 126 g of an objective compound was obtained (96% yield).

GPC (THF solvent) provided that the polymer obtained had a number-average molecular weight in terms of polystyrene of 5,000. The polymer was found to be soluble in NMP and THF, and to have Tg of 95° C. and a thermal decomposition temperature Td5 of 395° C.

The structure of the polymer obtained is probably represented by the formula (II) below:

Synthetic Example 4

Reaction was conducted in the same manner as in Synthetic Example 1, except that resorcinol was replaced with 74.21 g (0.367 mol) of 3,3'-dihydroxydiphenylether, 72.73 g (0.333 mol) of 4,4'-difluorobenzophenone, and 21.30 g (0.060 mol) for initial addition and 9.30 g (0.040 mol) for subsequent addition of 4-chloro-4'-fluorobenzophenone. Thus, 126 g of an objective compound was obtained (96% yield).

GPC (THF solvent) provided that the polymer obtained had a number-average molecular weight in terms of polystyrene of 5,000. The polymer was found to be soluble in NMP and THF, and to have Tg of 102° C. and a thermal decomposition temperature Td5 of 395° C.

The structure of the polymer obtained is probably represented by the formula (IV) below:

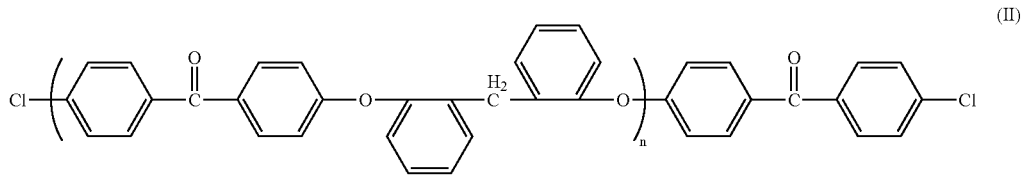

Synthetic Example 3

Reaction was conducted in the same manner as in Synthetic Example 1, except that resorcinol was replaced with 52.20 g (0.367 mol) of 1,3-benzenethiol, 84.67 g (0.333 mol) of 4,4'-difluorodiphenylsulfone, and 21.30 g (0.060 mol) for initial addition and 9.30 g (0.040 mol) for subsequent addition of 4-chloro-4'-fluorobenzophenone. Thus, 129 g of an objective compound was obtained (96% yield).

GPC (THF solvent) provided that the polymer obtained had a number-average molecular weight in terms of polystyrene of 1,000. The polymer was found to be soluble in NMP and THF, and to have Tg of 113° C. and a thermal decomposition temperature Td5 of 395° C.

The structure of the polymer obtained is probably represented by the formula (III) below:

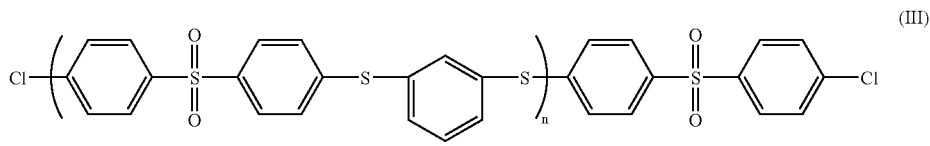

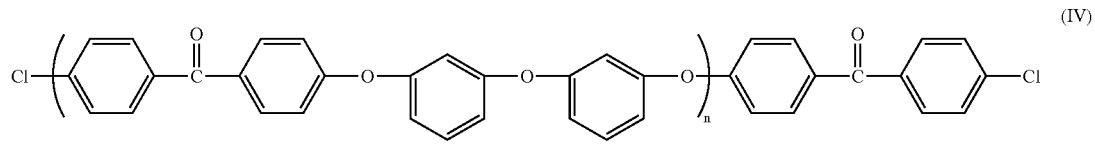

(IV)

Synthetic Example 5

Reaction was conducted in the same manner as in Synthetic Example 1, except that resorcinol was replaced with 40.21 g (0.365 mol) of hydroquinone. Thus, 87.3 g of an objective compound was obtained (89% yield).

GPC (THF solvent) provided that the polymer obtained had a number-average molecular weight in terms of polystyrene of 5,000. The polymer was found to be soluble in NMP and THF by heating, and to have Tg of 155C and a thermal decomposition temperature Td5 of 460° C.

The structure of the polymer obtained is probably represented by the formula (V) below:

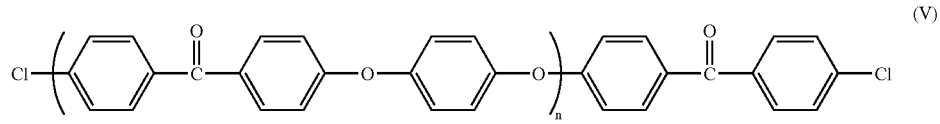

(V)

Example 1

(Synthesis of Polyarylene Copolymer)

A 300-ml separable flask was charged with 19.51 g (3.9 mmol) of the oligomer obtained in Synthetic Example 1, 22.51 g (56.1 mmol) of neopentyl 3-(2,5-dichlorobenzoyl) benzenesulfonate, 1.18 g (1.8 mmol) of bis(triphenylphosphine)nickel dichloride, 0.27 g (1.8 mmol) of sodium iodide, 6.30 g (24.0 mmol) of triphenylphosphine, and 9.41 g (144 mmol) of zinc powder, followed by purging with dry nitrogen. Subsequently, 100 ml of N-methyl-2-pyrrolidone was added to the flask, the mixture was heated to 80° C., and polymerization was performed for 4 hours with stirring.

The resultant polymerization solution was diluted with NMP and was filtered with use of Celite as a filter aid. The filtrate was poured into a large excess (500 ml) of methanol to coagulate and precipitate a product. Subsequently, the coagulated product was filtered off, air dried and redissolved in 200 ml of NMP. The solution was poured into a large excess (1500 ml) of methanol to coagulate and precipitate a product. The coagulated product was filtered off and dried in vacuo to give 34.4 g of an objective polyarylene copolymer (91% yield) GPC (NMP) provided that the number-average molecular weight and weight-average molecular weight in terms of polystyrene were 32,000 and 120,000, respectively.

(Synthesis of Sulfonic Group-Containing Polyarylene Block Copolymer)

A 300-ml separable flask equipped with a stirrer and a thermometer was charged with 20 g of the above polymer and 5.2 g (2 equivalent weights based on the sulfonate group) of lithium bromide. Subsequently, 160 ml of N-methyl-2-pyrrolidone was added, and the mixture was stirred in a nitrogen atmosphere at 130° C. for 5 hours. The solution obtained was poured into a large amount of acetone to precipitate a polymer. The precipitated product was filtered off, washed twice with 10% hydrochloric acid water, continuously washed with ion exchange water until the pH of the wash water became 5, and dried to give 16 g of a sulfonic group-containing polymer (94% yield) GPC (NMP) provided that the sulfonic group-containing polyarylene block copolymer had a number-average molecular weight and a weight-average molecular weight in terms of polystyrene of 38,000 and 143,000, respectively. The equivalent weight of sulfonic acid was 1.6 meq/g.

Example 2

A sulfonic group-containing polyarylene block copolymer was produced in the same manner as in Example 1, except that the oligomer obtained in Synthetic Example 1 was replaced with 9.05 g (1.8 mmol) of the oligomer obtained in Synthetic Example 2. GPC (NMP) provided that the sulfonic group-containing polyarylene block copolymer had a number-average molecular weight and a weight-average molecular weight in terms of polystyrene of 43,000 and 155,000, respectively. The equivalent weight of sulfonic acid was 1.6 meq/g.

Example 3

A sulfonic group-containing polyarylene block copolymer was produced in the same manner as in Example 1, except that the amounts of the oligomer obtained in Synthetic Example 1 and neopentyl 3-(2,5-dichlorobenzoyl) benzenesulfonate were changed to 9.01 g (1.8 mmol) and 23.36 g (58.2 mmol), respectively. GPC (NMP) provided that the sulfonic group-containing polyarylene block copolymer had a number-average molecular weight and a weight-average molecular weight in terms of polystyrene of 53,000 and 180,000, respectively. The equivalent weight of sulfonic acid was 2.3 meq/g.

Example 4

A sulfonic group-containing polyarylene block copolymer was produced in the same manner as in Example 1, except that the oligomer obtained in Synthetic Example 1 was replaced with 19.51 g (3.9 mmol) of the oligomer obtained in Synthetic Example 3. GPC (NMP) provided that the sulfonic group-containing polyarylene block copolymer had a number-average molecular weight and a weight-average molecular weight in terms of polystyrene of 29,000 and 100,000, respectively. The equivalent weight of sulfonic acid was 1.6 meq/g.

Example 5

A sulfonic group-containing polyarylene block copolymer was produced in the same manner as in Example 1, except that the oligomer obtained in Synthetic Example 1 was replaced with 19.51 g (3.9 mmol) of the oligomer obtained in Synthetic Example 4. GPC (NMP) provided that the sulfonic group-containing polyarylene block copolymer had a number-average molecular weight and a weight-average molecular weight in terms of polystyrene of 45,000 and 163,000, respectively. The equivalent weight of sulfonic acid was 1.6 meq/g.

Comparative Example 1

A sulfonic group-containing polyarylene block copolymer was produced in the same manner as in Example 1, except that the oligomer obtained in Synthetic Example 1 was replaced with 9.05 g (1.8 mmol) of the oligomer obtained in Synthetic Example 5. GPC (NMP) provided that the sulfonic group-containing polyarylene block copolymer had a number-average molecular weight and a weight-average molecular weight in terms of polystyrene of 41,000 and 140,000, respectively. The equivalent weight of sulfonic acid was 1.6 meq/g.

The copolymers obtained in Examples and Comparative Example were tested for equivalent of sulfonic acid, proton conductivity and other properties by the methods mentioned above. The results are shown in Table 1 below.

The invention claimed is:

1. A sulfonic group-containing polyarylene block copolymer comprising a polymer segment with an ion conductive component represented by the formula (A) and at least one polymer segment without an ion conductive component selected from polymer segments represented by the formulae (B-1), (B-2), (B-3), (B-4), (B-5) and (B-6):

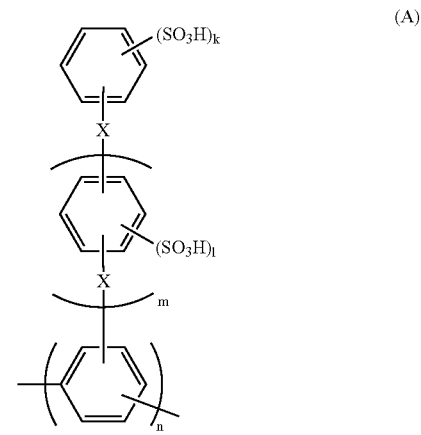

wherein X is a single bond, —CO—, —SO$_2$—, —SO—, —(CF$_2$)$_p$— (where p is an integer ranging from 1 to 10), —C(CF$_3$)$_2$—, —CH$_2$—, —C(CH$_3$)$_2$—, —O— or —S—; m is an integer ranging from 0 to 10; when m is any of 1 to 10, Xs may be the same or different; k is an integer ranging from 0 to 5; l is an integer ranging from 0 to 4; k+l≧1; n is a positive integer; and structural units making up the polymer segment may be the same or different in what is denoted by k, l, m and X;

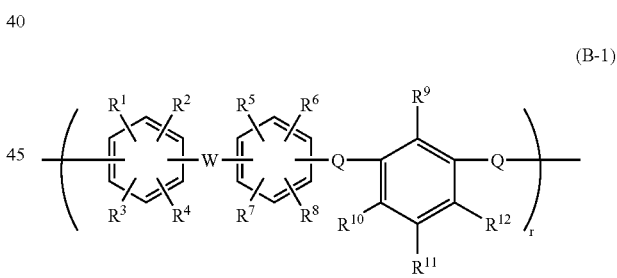

TABLE 1

| Sample | IEC (meq/g) | Proton conductivity (S/cm) | Elongation (%) | Breaking strength (MPa) | Inflection point of elastic modulus (° C.) | Electrode transfer ratio (%) |
|---|---|---|---|---|---|---|
| Ex. 1 | 1.6 | 0.152 | 85 | 99 | 129 | >90 |
| Ex. 2 | 1.6 | 0.167 | 75 | 76 | 105 | >90 |
| Ex. 3 | 2.3 | 0.300 | 55 | 106 | 130 | >80 |
| Ex. 4 | 1.6 | 0.149 | 70 | 88 | 115 | >90 |
| Ex. 5 | 1.6 | 0.168 | 77 | 86 | 106 | >90 |
| Comp. Ex. 1 | 1.6 | 0.158 | 80 | 124 | 160 | <50 |

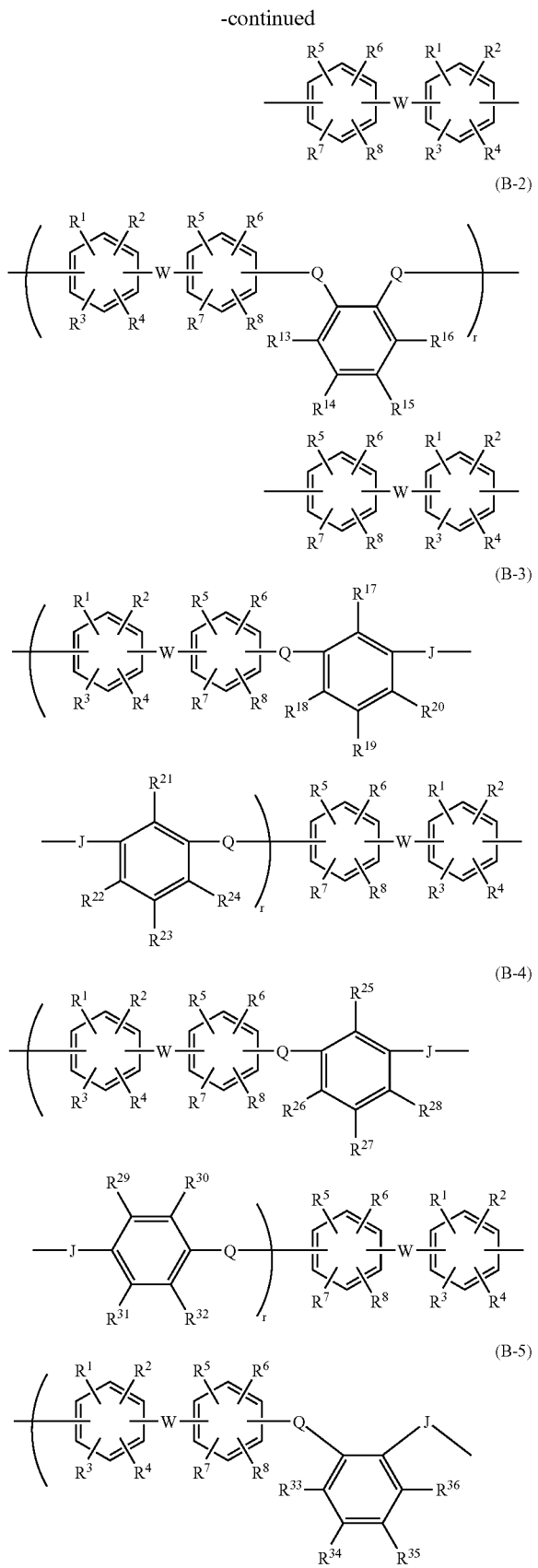
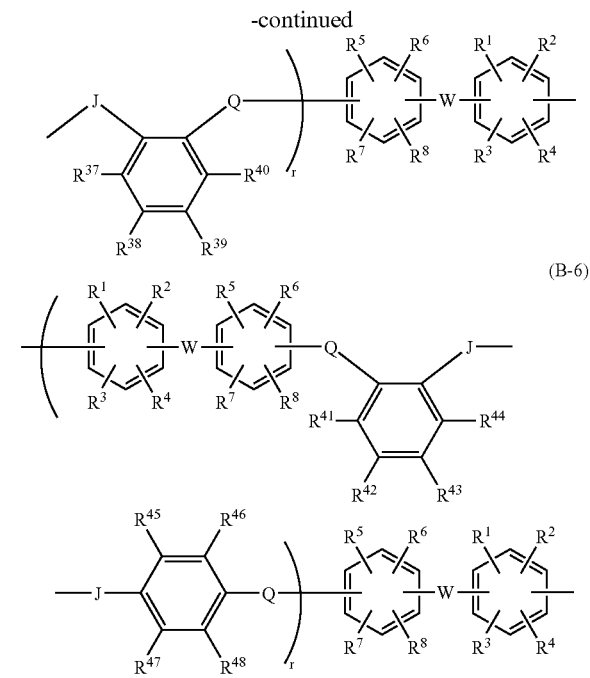

wherein $R^1$ to $R^{48}$ may be the same or different and are each at least one atom or group selected from the group consisting of a hydrogen atom, a fluorine atom, an alkyl group, a fluorine-substituted alkyl group, an allyl group, an aryl group and a cyano group; W is a single bond, —CO—, —SO$_2$—, —SO—, —CONH—, —COO—, —(CF$_2$)$_p$— (where p is an integer ranging from 1 to 10) or —C(CF$_3$)$_2$—; Q is a single bond, —O—, —S—, —CH=CH— or —C≡C—; J is a single bond, an alkylene group, a fluorine-substituted alkylene group, an aryl-substituted alkylene group, an alkenylene group, an alkynylene group, an arylene group, a fluorenylidene group, —O—, —S—, —CO—, —CONH—, —COO—, —SO— or —SO$_2$—; and r is a positive integer.

2. The sulfonic group-containing polyarylene block copolymer as described in claim 1, wherein the copolymer has an ion exchange capacity in the range of 0.3 to 5.0 meq/g.

3. A process for producing a sulfonic group-containing polyarylene block copolymer, the process comprising polymerizing either a monomer capable of forming a structural unit of a polymer segment represented by the formula (A) in claim 1 or a monomer capable of forming a structural unit of a polymer segment represented by the formula (B-1), (B-2), (B-3), (B-4), (B-5) or (B-6) in claim 1 to produce a precursor, and reacting the precursor with the other monomer to produce a polyarylene block copolymer as described in claim 1 or 2.

4. A polymer electrolyte comprising the sulfonic group-containing polyarylene block copolymer as described in claim 1 or 2.

5. A proton conductive membrane including the sulfonic group-containing polyarylene block copolymer as described in claim 1 or 2.

* * * * *